US011598960B1

(12) United States Patent
Auerbach

(10) Patent No.: US 11,598,960 B1
(45) Date of Patent: Mar. 7, 2023

(54) SYSTEMS AND METHODS FOR A HEADS-UP DISPLAY FOR AN ELECTRIC AIRCRAFT

(71) Applicant: BETA AIR, LLC, South Burlington, VT (US)

(72) Inventor: Joshua E. Auerbach, Waterbury Center, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/732,199

(22) Filed: Apr. 28, 2022

(51) Int. Cl.
  *G09B 9/44* (2006.01)
  *G09G 5/37* (2006.01)
  *G02B 27/01* (2006.01)
  *G06F 3/14* (2006.01)
  *B64D 43/00* (2006.01)

(52) U.S. Cl.
  CPC ......... *G02B 27/0101* (2013.01); *B64D 43/00* (2013.01); *G06F 3/14* (2013.01); *G02B 2027/014* (2013.01); *G02B 2027/0141* (2013.01)

(58) Field of Classification Search
  CPC .............................. G02B 27/0101; G02B 27/01
  See application file for complete search history.

(56) References Cited

U.S. PATENT DOCUMENTS

| | | | |
|---|---|---|---|
| 6,057,786 A | 5/2000 | Briffe et al. | |
| 6,101,431 A * | 8/2000 | Niwa | G01S 17/933 345/9 |
| 9,132,746 B2 | 9/2015 | Enomoto et al. | |
| 10,240,937 B2 | 3/2019 | Chung et al. | |
| 10,657,867 B1 | 5/2020 | Tiana et al. | |
| 10,850,635 B2 | 12/2020 | Jun et al. | |
| 10,933,745 B2 | 3/2021 | Shimotani et al. | |
| 11,034,297 B2 | 6/2021 | Takazawa et al. | |
| 11,072,343 B2 | 7/2021 | Emura et al. | |
| 2003/0194683 A1 * | 10/2003 | Vorst | G09B 9/326 434/38 |
| 2019/0068953 A1 * | 2/2019 | Choi | G01S 17/86 |
| 2021/0049925 A1 * | 2/2021 | Robinson | G09B 9/44 |

FOREIGN PATENT DOCUMENTS

EP  3229220 A1  10/2017

OTHER PUBLICATIONS

Amazon, Head-up Display, ACECAR Upgrade Head Up Display Dual Mode OBD2/GPS Windshield Projector with Speed, Overspeed Warning, Mileage Measurement, Water Temperature, Direction,for All Vehicles (M12).

* cited by examiner

*Primary Examiner* — Nan-Ying Yang
(74) *Attorney, Agent, or Firm* — Caldwell Intellectual Property Law, LLC

(57) ABSTRACT

A system for a head-up display for an electric aircraft is presented. The system includes an augmented reality device which may be operated by a pilot using a pilot device and a computing device connected to the pilot device, wherein the computing device is configured to receive an aircraft datum and generate a performance assessment model. The performance assessment model includes a plurality of information relevant to the operation of the electric aircraft. The augmented reality device further includes a projection device configured to project the performance assessment model onto an exterior view window and display the performance assessment model as a function of the projection device.

20 Claims, 9 Drawing Sheets

SYSTEMS AND METHODS FOR A HEADS-UP DISPLAY FOR AN ELECTRIC AIRCRAFT

FIELD OF THE INVENTION

The present invention generally relates to the field of augmented reality. In particular, the present invention is directed to systems and methods for a head-up display for an electric aircraft.

BACKGROUND

Pilots prefer maximal visibility when operating any vehicle. With the rise of electric vehicle technologies, pilots take to the skies to operate electric aircrafts in a mode of transportation that is constantly evolving. Navigating and operating complex systems and electronics of a functioning electric aircraft result in the need for optimal and enhanced visibility for the pilot in the position of the cockpit of the electric aircraft. However, current pilot cockpit multifunction displays and pilot dashboards may result in hindered navigating and analysis of operational flight information for pilots having to constantly change their views between through the exterior view windows and the dashboards. Alternatively, too much information clogging the exterior view window and display may impede the pilots forward vision.

SUMMARY OF THE DISCLOSURE

In an aspect, a system for a head-up display for an electric aircraft is presented. The system includes a computing device communicatively connected to the pilot device configured to receive an aircraft datum and generate a performance assessment model as a function of the aircraft datum. The system further includes an exterior view window and a data display component, wherein the data display component is configured to display the performance assessment model on the exterior view window.

In another aspect, a method for a head-up display for an electric aircraft is presented. The method includes receiving, by a computing device communicatively connected to a pilot device, an aircraft datum, generating a performance assessment model as a function of the aircraft datum, and displaying, by a data display component, the performance assessment model onto an exterior view window.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
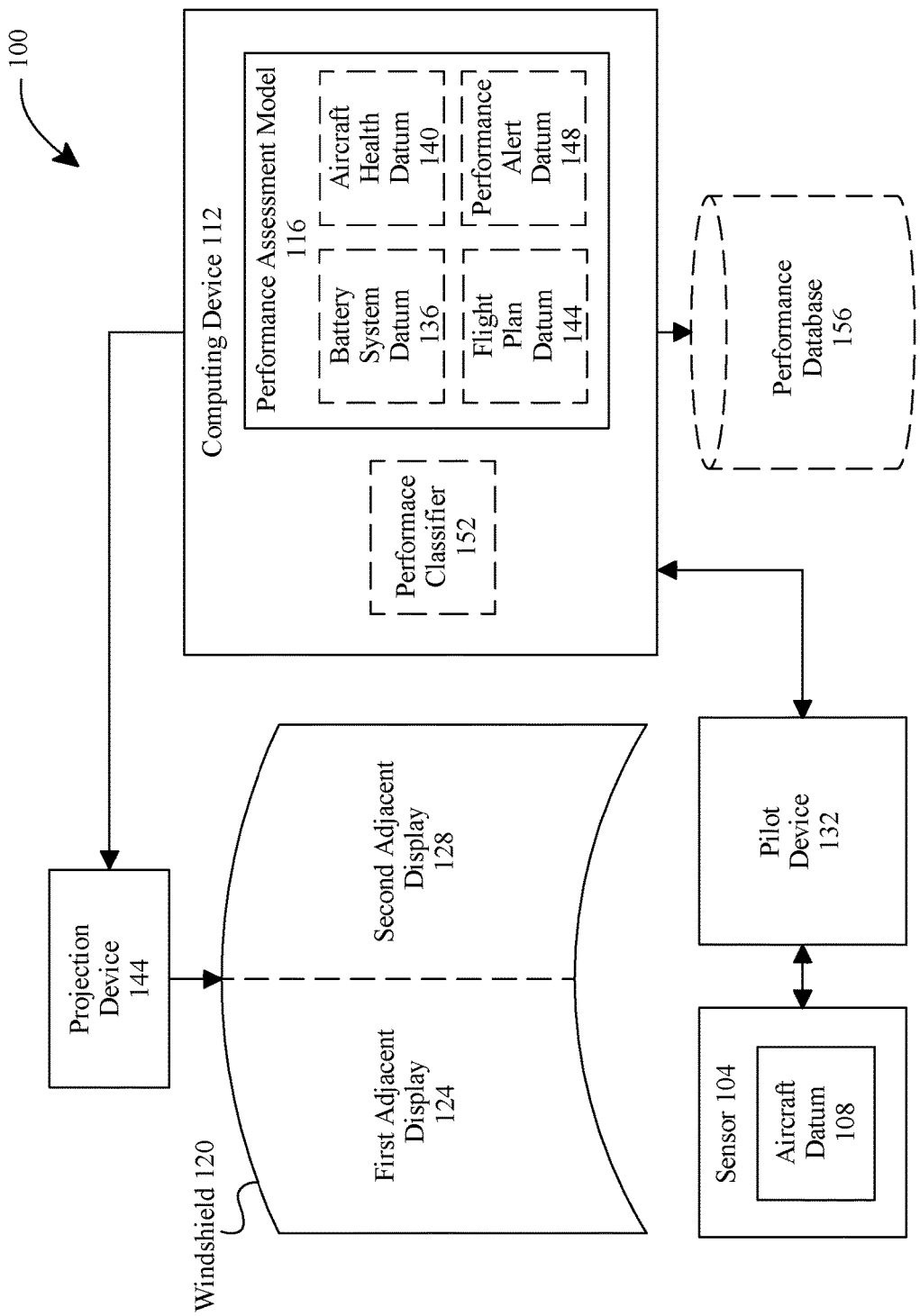
FIG. 1 is a block diagram of an exemplary embodiment of a system for a head-up display for an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

At a high level, aspects of the present disclosure are directed to systems and methods for a head-up display for an electric aircraft. In an embodiment, the present disclosure may be used for any electric aircraft such as an electric vertical take-off and landing (eVTOL). In an embodiment, aspects of the present disclosure may be incorporated into any cockpit of an electric aircraft. The cockpit may be encapsulated by an exterior view window in order to provide maximum or optimum visibility of the outside to the pilot. In an embodiment, the exterior view window may include an exterior view window wherein the ends of the display wrap around the pilot seat of the cockpit so that the display is in a position to be viewed by the peripherals of the pilot with minimal body movement.

Aspects of the present disclosure may include an augmented reality device. Aspects of the present disclosure may include projecting important flight instrument data on top of the exterior view window. In an embodiment, the exterior view window may include any transparent glass that provides protection to the pilot of outside forces but also allows for seamless viewing of the outside. Aspects of the present disclosure may also include cameras and sensors to continuously capture and monitor the outside of the electric aircraft and project a live feed of the outside onto the exterior view window. This is so, at least in part, to provide a visual of the outside of the electric aircraft to the pilot that the pilot may not be able to see as the pilot would trying to see from a transparent glass exterior view window from the cockpit of the electric aircraft. In an embodiment, aspects of the present disclosure may include a head-up display placed in between the exterior view window of the electric aircraft and the pilot wherein the head-up display may include transparent screen and display key flight information data in which the pilot may view the head-up display on top of the exterior view window and view an enhanced display with the flight information layered on top of the exterior view window of the electric aircraft. The head-up display may incorporate any augmented reality technologies. In another embodiment, aspects of the present disclosure may include modifying the presentation of flight information onto the head-up display or exterior view window based on the background image (e.g. live-feed of the outside or the outside as seen through a transparent exterior view window). In another embodiment, aspects of the present disclosure may prioritize the presentation of certain flight information that may be of more significance or priority. This is so, at least in part, to notify the pilot with minimal distraction of any systems or flight information requiring imminent attention. Aspects of the present disclosure can include computer modules to determine which information requires more priority. In an embodiment, aspects of the present disclosure can allow for the pilot to manipulate the flight information being presented such as moving the placement of the information, adjusting the transparency of certain information, removing certain flight information data, or locking in place displaying of certain flight information as it is being continuously calculated throughout all flight operations. The pilot may operate any pilot interface that may translate pilot inputs such as touching a touchpad, pressing buttons and key tabs, moving a joystick, etc.

Aspects of the present disclosure may also be used for flight simulation and training purposes. In a non-limiting embodiment, a flight simulator module that consists of replicas of electric aircraft components and an exterior view window may project a simulation of a virtual environment onto the display of the exterior view window. In an embodiment aspects of the present disclosure can be used as described above in a simulated environment and/or setting.

Exemplary embodiments illustrating aspects of the present disclosure are described below in the context of several specific examples.

Referring now to FIG. 1, an exemplary embodiment of a system 100 for a head-up display for an electric aircraft is illustrated. System includes a computing device 112. In a non-limiting embodiment, computing device 112 may include a flight controller. computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 112 may include a single computing device operating independently, or may include two or more computing device operating in concert, in parallel, sequentially or the like; two or more computing devices may be included together in a single computing device or in two or more computing devices. computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 112 may include but is not limited to, for example, a computing device or cluster of computing devices in a first location and a second computing device or cluster of computing devices in a second location. computing device 112 may include one or more computing devices dedicated to data storage, security, distribution of traffic for load balancing, and the like. computing device 112 may distribute one or more computing tasks as described below across a plurality of computing devices of computing device, which may operate in parallel, in series, redundantly, or in any other manner used for distribution of tasks or memory between computing devices. computing device 112 may be implemented using a "shared nothing" architecture in which data is cached at the worker, in an embodiment, this may enable scalability of system 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 112 and/or the flight controller may be controlled by one or more Proportional-Integral-Derivative (PID) algorithms driven, for instance and without limitation by stick, rudder and/or thrust control lever with analog to digital conversion for fly by wire as described herein and related applications incorporated herein by reference. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. A similar philosophy to attachment of flight control systems to sticks or other manual controls via pushrods and wire may be employed except the conventional surface servos, steppers, or other electromechanical actuator components may be connected to the cockpit inceptors via electrical wires. Fly-by-wire systems may be beneficial when considering the physical size of the aircraft, utility of for fly by wire for quad lift control and may be used for remote and autonomous use, consistent with the entirety of this disclosure. The computing device may harmonize vehicle flight dynamics with best handling qualities utilizing the minimum amount of complexity whether it be additional modes, augmentation, or external sensors as described herein.

With continued reference to FIG. 1, system 100 may be incorporated into a physical cockpit of the electric aircraft. The electric aircraft may include, but not limited to, an electric vertical take-off and landing (eVTOL) aircraft, an unmanned aerial vehicle (UAV), drone, etc. The physical cockpit may include any aircraft component that may be part of the physical cockpit as to a persons skilled in the art, upon reviewing the entirety of this disclosure, will be aware of For example and without limitation, the physical cockpit may include, but not limited to, a pilot seat, avionics, pilot controls (e.g. foot pedal, inceptor stick, joystick,), pilot dashboard, multifunctional display, primary flight display, etc. The physical cockpit may include an exterior view window 120 in front of the pilot seat for which pilot may view the surroundings of the electric aircraft through it. The physical cockpit may include a head-up display (HUD) that provides additional flight information data. Persons skilled in the art, upon reviewing the entirety of this disclosure, will be aware of the various components and functions found within a cockpit of an electric aircraft.

Still referring to FIG. 1, system 100 may include an augmented reality device. An "augmented reality" device, as used in this disclosure, is a device that permits a user to view a typical field of vision of the user and superimposes virtual images on the field of vision. The augmented reality device may include an exterior view window 120. A "exterior view window," for the purpose of this disclosure, is a portion of the augmented reality device that admits a view of field of vision. In a non-limiting embodiment, exterior view window 120 may be configured to allow the viewing of the surroundings of the electric aircraft or at least the surroundings of the electric aircraft from the position of a pilot seated inside a cockpit of the electric aircraft. The surroundings may include any physical environmental objects outside of the electric aircraft. In another non-limiting embodiment, exterior view window 120 may include a transparent window. The transparent window may allow for the pilot seated inside the electric aircraft to view the surroundings of the electric aircraft. Alternatively and/or additionally, exterior view window 120 may include a screen configured to display a live feed of the outside environment of the electric aircraft captured, detected, and/or recorded continuously using cameras and/or sensors. A "live-feed," for the purpose of this disclosure, is a simultaneously recorded and broadcasted media in real-time. For example and without limitation, cameras may be disposed on the electric aircraft faced in outward directions from the perspective of the cockpit of the electric aircraft and/or the body of the electric aircraft. "Disposed," for the purpose of this disclosure, is an arrangement of a device onto another object. The cameras may continuously record the outside environment of the electric aircraft and broadcast/display it onto exterior view window 120 in real-time. This is so, at least in part, that the pilot of electric aircraft may not be restricted to the limitations of visibility posed by the location of the cockpit of the electric aircraft and/or the pilot inside the cockpit. Persons skilled in the art, upon reviewing the entirety of this disclosure, will be aware of recording and broadcasting onto a display for real-time viewing and navigation in the context of operating an electric aircraft and the displaying of information to the pilot of the electric aircraft. In a non-limiting embodiment, exterior view window 120 may include a windshield. A "windshield," for the purpose of this disclosure, is a front window that provides visibility of the exterior of the windshield while protecting the pilot and systems enclosed within the electric aircraft and the windshield from outside elements. In a non-limiting embodiment, the windshield may be configured to act as a surface for display of enhanced computer-generated images for augmented reality purposes.

With continued reference to FIG. 1, exterior view window 120 may include a head-up display (HUD). A "head-up display," for the purpose of this disclosure, is transparent display configured to present data without requiring users to look away from their usual viewpoints. The HUD may include any computing device as described consistently in the entirety of this disclosure. For example and without limitation, the HUD may be placed in front of the pilot and in between the pilot and exterior view window 120. In a non-limiting embodiment, exterior view window 120 may be configured to display any information such as performance assessment model 116. In another non-limiting embodiment, exterior view window 120 may display performance assessment model 116 as a function of the HUD. For example and without limitation, the HUD may include a transparent display configured to display a plurality of information related to the operation of the electric aircraft. This is so, at least in part, so that the pilot may view the surroundings of the electric aircraft as seen through exterior view window 120 and the plurality of information being shown by the HUD so that the pilot's head is positioned "up"

and looking forward. For example and without limitation, the HUD may be placed so that the pilot does not have to angle the pilot's head to view the information presented by the HUD while viewing the surroundings. In another non-limiting example, the HUD may be positioned in a way as though the information being presented appears to be layered in front of the exterior view window so that the pilot may navigate the electric aircraft and its surroundings being seen through exterior view window 120 while also being aware of any information being presented by the HUD with minimal head movement and distraction. In a non-limiting embodiment, the HUD may include a headset. A "headset," for the purpose of this disclosure, is a wearable equipment that a pilot can place around the pilot's head that includes audio equipment and a microphone for enhanced communication purposes. The headset may incorporate the HUD as a part of a helmet for the pilot to wear. In a non-limiting embodiment, the headset may include a head-mounted display (HMD). The HMD may include a display optic that may act as a monocular and/or binocular HMD that provides enhanced HUD functionalities. Persons skilled in the art, upon reviewing the entirety of this disclosure, will be aware of the various embodiments, incorporations, and placements of a HUD for piloting purposes as described herein.

Still referring to FIG. 1, the HUD may be incorporated into a wearable headset and/or eyeglasses that the pilot may wear that provides enhanced perceptual information related to the operation of the electric aircraft. The wearable HUD may include, but not limited to, a display incorporated in eyeglasses, goggles, headsets, helmet display systems, or the like, a display incorporated in contact lenses, an eye tap display system including without limitation a laser eye tap device, VRD, or the like. For example and without limitation, the eyeglasses may include transparent portion of goggles such as lenses or the like. In a non-limiting embodiment, exterior view window 120 may be configured to allow the viewing of the surroundings of the electric aircraft or at least the surroundings from the point of view of the pilot's position in the cockpit. Additionally and/or alternatively, exterior view window 120 may also include a transparent screen that may display the plurality of information related to the operation of the electric aircraft, wherein the plurality of information may only be seen through the lenses of the HUD in a headset and/or eyeglasses configuration. This is so, at least in part, to provide the displaying of the plurality of information as a three-dimensional model from the perspective of the pilot instead of a one-dimension screen. In this configuration, the pilot may freely move the pilot's head and see the enhanced perceptual information anywhere on the exterior view window instead of being limited to aligning the pilot's view with a single screen and exterior view window 120. In another non-limiting embodiment, exterior view window 120 may only display the plurality of information through the lenses of the headset and/or eyeglasses; removing the headset and/or eyeglasses may allow the pilot to view the surroundings of the electric aircraft as is through exterior view window 120 acting as a transparent window. Persons skilled in the art, upon reviewing the entirety of this disclosure, will be aware of the various embodiments of using a wearable HUD and the various configurations of information being displayed.

With continued reference to FIG. 1, alternatively and/or additionally. the HUD may be incorporated into exterior view window 120. In a non-limiting embodiment, cameras disposed onto exterior view window 120 may capture and measure data of any objects and provide real-time information onto exterior view window 120. For example and without limitation, the HUD may display virtual signals such as, but not limited to, highlights, outlines, arrows, warning signs, etc., aligned with the objects as seen on exterior view window 120. This is so, at least in part, to provide enhanced perceptual information without the need of a separate wearable device or any HUD supported device. Persons skilled in the art, upon reviewing the entirety of this disclosure, will be aware of the various embodiments of enhanced perceptual information being displayed onto objects being seen through an exterior view window in the context of augmented reality.

Still referring to FIG. 1, exterior view window 120 may include an exterior view window. A "exterior view window," for the purpose of this disclosure, is an electronic display with ends flexed toward a central point and forming a concave arc. For example and without limitation, exterior view window 120, which may include a display, may include a liquid crystal display, a projected light display, such as employing scanners (e.g., MEMS) and coherent light sources (e.g., lasers), a graphical user interface, and/or the like thereof. In a non-limiting embodiment, the exterior view window may include a monitor or a plurality of monitors to form a concave arc. For example and without limitation, the exterior view window may include one curved display. In another non-limiting example, the exterior view window may include a plurality of flat monitors placed adjacently to form a polygonal concave arc. In a non-limiting embodiment, the exterior view window may flex its ends toward the pilot and/or the cockpit of the electric aircraft. In another non-limiting embodiment, the exterior view window may seem to wrap around the pilot and/or the cockpit of the electric aircraft. For example and without limitation, the exterior view window may flex its ends to wrap horizontally. In another non-limiting example, the exterior view window may wrap horizontally and/or vertically in the shape of a partial dome. A "partial dome," for the purpose of this disclosure, is a portion of a shape of a dome that encompasses a pilot and/or the cockpit of the electric aircraft. In a non-limiting embodiment, the exterior view window may include a full dome configured to encompass the pilot to provide a fully immersive simulated experience. For example and without limitation, concave screen 120 may be 180 degrees horizontally curved towards the central point and 180 degrees vertically curved towards the central point. In a non-limiting embodiment, the exterior view window may include a curved display shaped as a partial sphere, wherein the partial sphere is angled between, but not limited to, 180 degrees and 360 degrees, so that the partial sphere may encompass at least a portion of the at least a physical cockpit or enough wherein the pilot may be unable to see outside of the exterior view window in the pilot's peripherals. Persons skilled in the art, upon reviewing the entirety of this disclosure, will be aware of the various embodiments of the exterior view window for purposes as described herein.

With continued reference to FIG. 1, exterior view window 120 may include one or more adjacent displays communicatively connected to each other to form exterior view window 120. In a non-limiting embodiment, exterior view window 120 may include a first adjacent display 124 and a second adjacent display 128. An "adjacent display," for the purpose of this disclosure, is an electronic display configured to display an image and connect to other adjacent displays. First adjacent display 124 and/or second adjacent display 128 may include any display as described consistently with the entirety of this disclosure. In a non-limiting embodiment, first adjacent display 124 and second adjacent display 128 may be identical in shape, size, and/or function. In another non-limiting embodiment, first adjacent display 124 and/or second adjacent display 128 may have some form of concave shape. For example and without limitation, first adjacent display 124 and second adjacent display may be connected on one end of each display to form the concave arc of exterior view window 120. Persons skilled in the art, upon reviewing the entirety of this disclosure, will be aware of the various combinations, configurations, and shapes of multiple adjacent displays that may be employed in exterior view window 120 consistently with the entirety of this disclosure.

Still referring to FIG. 1, exterior view window 120 may be split symmetrically and/or vertically symmetrically wherein the resulting split screens are first adjacent display 124 and second adjacent display 128. This is so, at least in part, to allow for components of simulator module 116 to be modular. For example and without limitation, first adjacent display 124 and/or second adjacent display 128 may be aligned next to each other in any order or formation. In another non-limiting example, first adjacent display 124 and/or second adjacent display 128 may include a HUD. configured to be at the center of the alignment of displays. First adjacent display 124 and/or second adjacent display 128 may be collapsible, modular, foldable, separable, etc.

Still referring to FIG. 1, the augmented reality device of system 100 may include a pilot device 132. A "pilot device," for the purpose of this disclosure, is an interactive and functional electronic instrument within a physical cockpit used by a pilot that provides crucial information in flight. In a non-limiting embodiment, pilot device 132 may provide information of the electric aircraft the pilot is piloting such as, but not limited to, altitude, airspeed, vertical speed, heading and much more other crucial information in flight. In a non-limiting embodiment, pilot device 132 may include any computing device consistently with the entirety of this disclosure. In another non-limiting embodiment, pilot device 132 may be configured to support avionics and/or simulated avionics to which a persons skilled in the art, upon reviewing the entirety of this disclosure, will be aware of the implementation of avionics for the purpose of a simulated environment. In a non-limiting embodiment, pilot device 243 may include a functional primary flight display (PFD), a functional electronic instrument system (EFIS), a functional electronic horizontal situation indicator (EHSI), and the like thereof. In a non-limiting embodiment, the simulated avionics may include the equipment and electronics to support communication, navigation, multi-system management, and the like thereof.

With continued reference to FIG. 1, pilot device 132 may include a graphical user interface (GUI), which may include any displays as described above, including without limitation a concave screen 120. In a non-limiting embodiment, the GUI may be configured to display visual indicators that may be used with real electric aircraft, such as but not limited to, altitude, wind speed, aircraft speed, roll, yaw, pitch, flight component status, torque of a flight component, temperature of a battery, power output of a battery, remaining battery charge, battery health, and/or fuel supply. In another non-limiting embodiment, the GUI may display a flight plan in graphical form. Graphical form may include a two-dimensional plot of two variables that represent data received by the controller, such as past maneuvers and predicted future maneuvers. In one embodiment, GUI may also display a user's input in real-time. GUI may be configured to show a primary flight display. The primary flight display may include an airspeed indicator, altitude indicator, slip skid indicator, altimeter, vertical speed indicator (VSI), turn indicator, horizontal situation indicator, and/or a turn rate indicator. In some embodiments, the primary flight display may include a general cruising speed, a ground airspeed, a flap range, a best angle of climb speed, a rotation speed and/or a best rate of climb speed. The PFD may include a transponder code, air temperature, waypoint, distance to waypoint, time and/or compass. In some embodiments, the GUI may display a flight maneuver that was just performed by the pilot, a suggested maneuver to be performed, and a maneuver being currently performed by the pilot. In some embodiments, the GUI may display a different suggested maneuver upon deviation by the user from flight plan. In a nonlimiting example, the GUI may display different color schemes for immediate past maneuver, suggested immediate future maneuver, and a maneuver being currently performed. In one embodiment, additionally to the flight plan, GUI may display an objective and a directional line once objective is nearby. In one embodiment, GUI may display a directional path to the objective when the flight plan is set for an intermediate objective. In a nonlimiting example, the GUI may display a dotted path additionally to the suggested maneuvers and a graphical representation of the objective one user gets near the objective as to assist user when landing or reaching objective. In another nonlimiting example, the GUI may display a dotted line connected to the final objective as to keep user informed of direction of final objective when flight plan is set for an intermediate objective.

Still referring to FIG. 1, the GUI may display a warning symbol to the pilot. A "warning symbol," for the purpose of this disclosure, is an indicative sign of a significant event associated with a component of the electric aircraft or simulation of the electric aircraft. The warning symbol may include an abbreviation, a sign, or combination thereof. The warning symbol may highlight itself in blinking form, different colors, or combination thereof. Examples of warning symbols may indicate, but not limited to, a malfunction or failure of at least a flight component, flight controller, unfavorable landing location, and the like. The warning symbol or plurality of warning symbols may dissuade the pilot from undertaking a disadvantageous action. Examples of disadvantageous actions include, but not limited to, at least actions that may harm the simulated electric aircraft or flight components, actions that may hard the pilot, actions that may produce collateral damage, and the like. In a non-limiting embodiment, pilot device 132 may include a locator component. A "locator component," as used in this disclosure, is a device and/or component that a pilot can use to point a cursor at a point on exterior view window 120 and/or the HUD. The locator component may include without limitation a wired or wireless mouse, a touchpad, a touchscreen, a game controller, or the like. The locator component may include a motion-capture device, such as without limitation a device that tracks motion of offsite surgeon's hands optically and/or using a sensor of motion, which may be implemented in any way suitable for implementation of sensor 104 as described above. In a non-limiting embodiment, the locator component may be incorporated with pilot device 132. In another non-limiting embodiment, the locator component may be utilized to control a cursor that may be seen on the HUD and/or exterior view window 120, wherein the cursor may be used to perform various actions around the information being displayed (e.g. performance assessment model 116). The locator component may include, but not limited to, a joystick, directional pad, buttons, switches, key tabs, etc. The various actions may include moving, minimizing, maximizing, moving, adjusting transparency, and/or locking in place certain information of performance assessment model 116 as displayed on exterior view window 120 and/or the HUD. In another non-limiting embodiment the locator component may be a part of a pilot control communicatively connected to pilot device 132. As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. Persons skilled in the art, upon reviewing the entirety of this disclosure, will be aware of the various embodiments of controlling a cursor for visual data manipulation for purposes as described herein. Persons skilled in the art, upon reviewing the entirety of this disclosure, will also be aware of the various warning symbols that may be employed to grab the attention of a pilot in the context of simulation consistently described in the entirety of this disclosure.

Still referring to FIG. 1, the augmented reality device of system 100 may include sensor 104. A "sensor," for the purposes of this disclosure, is an electronic device configured to detect, capture, measure, or combination thereof, a plurality of external and electric aircraft component quantities. In a non-limiting embodiment, sensor 104 may be integrated and/or connected to at least an actuator, a portion thereof, or any subcomponent thereof. Sensor 104 may include a photodiode configured to convert light, heat, electromagnetic elements, and the like thereof, into electrical current for further analysis and/or manipulation. In another non-limiting embodiment, sensor 104 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by sensor 104 may include circuitry, computing devices, electronic components or a combination thereof that translates into at least an electronic signal configured to be transmitted to another electronic component. Sensor 104 may be disposed on at least an actuator of the electric aircraft. An "actuator," for the purpose of this disclosure, is any flight component or any part of an electric aircraft that helps it to achieve physical movements by converting energy, often electrical, air, or hydraulic, into mechanical force and enable movement. "Disposed," for the purpose of this disclosure, is the physical placement of a computing device on an actuator. In a non-limiting embodiment, actuator may include a flight component. In a non-limiting embodiment, sensor 104 may include a plurality of individual sensors disposed on each actuator of the electric aircraft. In a non-limiting embodiment, sensor 104 may be mechanically and communicatively connected to one or more throttles. The throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in U.S. patent application Ser. No. 16/929, 206 and titled, "Hover and Thrust Control Assembly for Dual-Mode Aircraft", which is incorporated herein in its entirety by reference. In a non-limiting embodiment, sensor 104 may be mechanically and communicatively connected to an inceptor stick. The pilot input may include a left-hand strain-gauge style STICK for the control of roll, pitch and yaw in both forward and assisted lift flight. A 4-way hat switch on top of the left-hand stick enables the pilot to set roll and pitch trim. Inceptor stick may include any inceptor stick as described in the entirety of this disclosure. Persons skilled in the art, upon reviewing the entirety of this disclosure, will be aware various embodiments and functions of a pilot input and inceptor stick for purposes as described herein.

Referring still to FIG. 1, sensor 104 may be mechanically and communicatively connected to a foot pedal. "Mechanically connected," for the purpose of this disclosure, is the joining of two or more elements by mechanical components such as fasteners, bolts, rivets, screws, clamps, etc.. A stick may be calibrated at zero input (relaxed state) and at the stops in pitch and roll. The calibration may be done in both directions of roll and both directions of pitch. Any asymmetries may be handled by a bilinear calibration with the breakpoint at the neutral point. Likewise, a yaw zero point may correspond to a relaxed state of an inceptor stick. The full-scale torque in each twist direction may be independently calibrated to the maximum torque seen in the calibration process in that direction. In all phases of flight, the control surface deflections may be linearly mapped to their corresponding maximum stick deflections and neutral position. In the case of roll, where there may be more aileron deflection in the trailing edge up direction, the degrees of deflection per pilot input unit may be different in each direction, such that full surface deflection may be not reached until full stick deflection. When the lift fans are engaged, the pilot's stick inputs may correspond to roll and pitch attitude (+/-30 deg) and yaw rate (+/-60 deg/second) commands, which are also linearly mapped to the full range of stick travel. A breakout force of 2-3 Newtons measured at center of stick grip position may be applied prior to the linear mapping. Breakout force prevents adverse roll yaw coupling. In order to remove the need for constant control input in steady forward flight, pitch and roll trim may be available. Pitch trim may be limited to +7 deg pitch up trim and -5 deg pitch down trim, which may be sufficient to trim for level flight over the entire center of gravity and cruise airspeed range in non-limiting examples. Roll trim limited to 2 degrees (average between the ailerons) may be also available. The trim may be applied after the breakout force to change the input that center stick corresponds to. This trimmed command applies to both the attitude commands when the lift rotors are powered, and the control surface deflections at all times. In order to ensure the pilot can always access the full capability of the aircraft, the mapping below from pre-trim input to post-trim input may be used when trim is nonzero. Note that with positive trim, the effective sensitivity in the positive direction has decreased while the sensitivity in the negative direction has increased. This is a necessary byproduct of enforcing the constraint that full stick deflection yields full control surface deflection. The lift lever has very low additional breakout torque and requires a constant (but adjustable) torque of 3.1 Nm during movement, which translates to 2 lbf at the intended grip position. Control of the lift motors may be only active when the assisted lift lever may be raised above 3.75 degrees from the full down stop (out of 25 degrees total). This may represent a debounce mechanism that may be determined based on the friction of the assisted lift lever, the mass and the expected cockpit vibration levels. A mechanical detent may be installed on the lift lever at an angle corresponding to 15% average torque in order to provide kinesthetic feedback to the pilot of the minimum lift lever setting which provides adequate control authority via the lift fans.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment sensor 104 ranges may include a technique for the measuring of distances or slant range from an observer including sensor 104 to a target which may include a plurality of outside parameters. "Outside parameter," for the purposes of this disclosure, refer to environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may targe an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 may include a proximity sensor. A "proximity sensor," for the purpose of this disclosure, is a sensor configured to detect the presence of nearby aircrafts or environmental objects in the air. In a non-limiting embodiment, the proximity sensor may include, for example, a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In an embodiment, the proximity sensor may be configured to detect the location of an incoming electric aircraft and/or any nearby objects, the distance of the electric aircraft from the proximity sensor, the attitude and/or altitude of the electric aircraft. In some embodiment, the proximity sensor may include, a capacitive sensor, a capacitive displacement sensor, a Doppler effect (sensor based on doppler effect) sensor, an inductive sensor, a magnetic sensor, an optical sensor, a photoelectric sensor, a laser rangefinder sensor, a passive thermal infrared sensor, a radar, a sonar, an ultrasonic sensor, a fiber optics sensor, a Hall effect sensor, and the like thereof.

With continued reference to FIG. 1, in one or more embodiments, sensor 104 may include electrical sensors. Electrical sensors may be configured to measure voltage across a component, electrical current through a component, and resistance of a component. In one or more embodiments, sensor 104 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 104, may be measured in Fahrenheit (° F.), Celsius (° C.), Kelvin (° K.), or another scale alone or in combination. The temperature measured by sensors may comprise electrical signals, which are transmitted to their appropriate destination wireless or through a wired connection. In some embodiments, sensor 104 may include a plurality of sensing devices, such as, but not limited to, temperature sensors, humidity sensors, accelerometers, electrochemical sensors, gyroscopes, magnetometers, IMU, pressure sensor, proximity sensor, displacement sensor, force sensor, vibration sensor, air detectors, hydrogen gas detectors, and the like.

With continued reference to FIG. 1, sensor 104 including the IMU may be configured to detect an aircraft angle. An "aircraft angle," for the purpose of this disclosure, is the angular position of the electric aircraft and any information about the orientation of the aircraft in three-dimensional space such as pitch angle, roll angle, yaw angle, or some combination thereof. In non-limiting examples, at least an aircraft angle may use one or more notations or angular measurement systems like polar coordinates, cartesian coordinates, cylindrical coordinates, spherical coordinates, homogenous coordinates, relativistic coordinates, or a combination thereof, among others. In a non-limiting embodiment, the IMU may be configured to detect at least an aircraft angle rate. An "Aircraft angle rate," for the purpose of this disclosure, is any information about the rate of change of any angle associated with an electrical aircraft as described herein. Any measurement system may be used in the description of the at least an aircraft angle rate.

With continued reference to FIG. 1, sensor 104 may further include a sensor suite. One or more sensors may be communicatively connected to at least a pilot control, the manipulation of which, may constitute at least an aircraft command. In a non-limiting embodiment, sensor 104 communicatively connected to the pilot control may include a sensor disposed on, near, around or within the pilot control. Further referring to FIG. 1, at least pilot control may be physically located in the cockpit of the aircraft or remotely located outside of the aircraft in another location communicatively connected to at least a portion of the aircraft. In a non-limiting embodiment, communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like.

Still referring to FIG. 1, sensor 104 may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. Sensor 104 may be part of a sensor suite wherein individual sensors may include separate sensors measuring physical or electrical quantities that may be powered by and/or in communication with circuits independently, where each may signal sensor output to a control circuit such as a user graphical interface. As a further example a degree of torque may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure.

With continued reference to FIG. 1, sensor 104 may be attached to one or more pilot inputs and attached to one or more pilot inputs, one or more portions of an aircraft, and/or one or more structural components, which may include any portion of an aircraft as described in this disclosure. The pilot inputs may be consistent with any pilot input as described in the entirety of this disclosure. As used herein, a person of ordinary skill in the art would understand "attached" to mean that at least a portion of a device, component, or circuit is connected to at least a portion of the aircraft via a mechanical connection. Said mechanical connection can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, sensor 104 may be mechanically and/or communicatively connected to the pilot control. A "pilot control," for the purpose of this disclosure, is an interactive mechanism or means which allows a pilot to control operation of flight components of an electric aircraft. In a non-limiting embodiment, the pilot control may be used by a pilot to manipulate and/or command the components of the electric aircraft. For example and without limitation, the pilot control may be a mechanism used to manipulate the movement of a simulated electric aircraft and generate simulated flight maneuvers. The pilot control may be communicatively connected to sensor 104 and receive a pilot input. A "pilot input" for the purpose of this disclosure, is as any gauge, throttle lever, clutch, dial, control, or any other mechanical or electrical device that is configured to be manipulated by a pilot to receive information. In a non-limiting embodiment, the pilot control may be physically located in the cockpit of the aircraft or remotely located outside of the aircraft in another location communicatively connected to at least a portion of the aircraft. The pilot control may include buttons, switches, or other binary inputs in addition to, or alternatively than digital controls about which a plurality of inputs may be received. In a non-limiting embodiment, the pilot input may include a physical manipulation of a control like a pilot using a hand and arm to push or pull a lever, or a pilot using a finger to manipulate a switch. In another non-limiting embodiment, the pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to sensor 104. In some cases, simulator module 120, the physical cockpit, and the pilot control may include sensor 104 and/or be communicatively connected to sensor 104. In a non-limiting embodiment, sensor 104 may be communicatively connected to computing device 112. In some cases, sensor 104 may be configured to detect a user interaction with the at the least a pilot control. Persons skilled in the art, upon reviewing the entirety of this disclosure, will be aware of the various embodiments and functions of the at least a pilot control for purposes as described herein.

With continued reference to FIG. 1, sensor 104 may be connected to a pilot control such as a throttle. The throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in the entirety of this disclosure. In a non-limiting embodiment, sensor 104 may be mechanically and communicatively connected to an inceptor stick, wherein the inceptor stick may include any inceptor stick consistently in the entirety of this disclosure. For example and without limitation, sensor 104, as a function of the pilot control, may be configured to recognize a pilot input which may include a left-hand strain-gauge style STICK for the control of roll, pitch and yaw in both forward and assisted lift flight. A 4-way hat switch on top of the left-hand stick enables the pilot to set roll and pitch trim. Persons skilled in the art, upon reviewing the entirety of this disclosure, will be aware various embodiments and functions of a pilot input and inceptor stick for purposes as described herein.

Still referring to FIG. 1, the pilot control may include an aircraft control. As used in this disclosure an "aircraft control" is a control and/or guidance system that maneuvers the aircraft. In an embodiment, the aircraft control may include a mechanical and/or manually operated flight control system. For example, and without limitation the aircraft control may include a collective control. As used in this disclosure a "collective control" is a mechanical control of an aircraft that allows a pilot and/or other operator to adjust and/or control the pitch angle of aircraft. For example and without limitation, collective control may alter and/or adjust a pitch angle of all the main rotor blades collectively. For example, and without limitation the aircraft control may include a yoke control. As used in this disclosure a "yoke control" is a mechanical control of an aircraft to control the pitch and/or roll. For example and without limitation, yoke control may alter and/or adjust the roll angle of aircraft as a function of controlling and/or maneuvering ailerons. In an embodiment, the aircraft control may include one or more foot brakes, control sticks, pedals, throttle levels, and the like thereof. Additionally or alternatively, the aircraft control may be configured to translate a desired command from aircraft datum 108. As used in this disclosure a "desired command" is a direction and/or command that a pilot desires, wishes, and/or wants for a flight component. In an embodiment, and without limitation, desired command may include a desired torque for a flight component. For example, and without limitation, the aircraft control may translate that a desired torque for a propeller be 160 lb. ft. of torque. As a further non-limiting example, the aircraft control may translate that a pilot's desired torque for a propulsor be 290 lb. ft. of torque. In another embodiment, the aircraft control may include a digital and/or automated flight control system. For example, and without limitation, the aircraft control may include a computing device and/or flight controller capable of producing an autonomous function. Persons skilled in the art, upon reviewing the entirety of this disclosure, will be aware of the various embodiments of an aircraft control for the purposes as described in the entirety of this disclosure.

Still referring to FIG. 1, the pilot control may be configured to receive and transmit a pilot command to a computing device 112. In this disclosure, "pilot command" is an element of data identifying and/or describing the desire of the pilot to follow a flight path. For example and without limitation, the pilot command may include but are not limited to ascent of the aircraft after takeoff, descent of the aircraft during landing, and the like, among others. The pilot command may be manually entered by pilot and/or may be obtained from autopilot, or the like. Additionally but not limited to, the pilot command may be obtained based on visual cues, tactile cues, flight display, and the like. The pilot command may also be obtained from the pilot controlling the electric aircraft in real-time. In a non-limiting embodiment, the pilot command may be generated by the input of the pilot control. In some embodiments, the pilot command may be configured to identify a torque of a flight component of an electric aircraft model as a function of the input of the user. The pilot command may be configured to identify a torque applied to a simulated flight component of a simulation of the electric aircraft based on the user input of the computing device. Persons skilled in the art, upon reviewing the entirety of this disclosure, will be aware of the various functions and embodiments of a pilot command for purposes as described herein.

With continued reference to FIG. 1, sensor 104 may be configured to detect measured aircraft data. A "measured aircraft data," for the purpose of this disclosure, is a collection of information describing any data describing the operation, function, environmental factors, outside parameters, etc. that may be involved with the electric aircraft and its systems. In a non-limiting embodiment, the measured aircraft data may include a plurality of maneuver data. A "plurality of maneuver data," for the purpose of this disclosure, is any collection of information describing completion by the pilot of procedures and concepts that control the electric aircraft, a simulated electric aircraft, and/or the simulator module. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

Still referring to FIG. 1, sensor 104 may be designed and configured to capture the measured aircraft data of incoming objects. In a non-limiting embodiment, as the electric aircraft is flying in the air, sensor 104 may focus its data collection on objects that may mostly affect the electric aircraft and its systems. In a non-limiting embodiment, sensor 104 may focus on incoming flying objects (e.g., other flying aircrafts, flying animals, clouds, etc.), infrastructures, natural terrains, etc., or any object that may approach the electric aircraft in its flight. In another non-limiting embodiment, sensor 104 disposed on a plurality of actuators of the electric aircraft (e.g. electric motor, propellors, propulsors, exterior view window, fuselage, wings, tail, etc.) to capture data that may be relevant to the movement of the electric aircraft. In a non-limiting embodiment, sensor 104 may be connected to a power source of the electric aircraft such as a battery pack. For example and without limitation, sensor 104 may be configured to detect at least an electrical parameter from the battery pack, such as, but not limited to, power consumption, battery capacity, remaining battery, battery degradation levels, battery pack temperature, etc. Persons skilled in the art, upon reviewing the entirety of this disclosure, will be aware of focusing the capture of a plurality of data that is the most susceptible to change for purposes as described herein.

With continued reference to FIG. 1, sensor 104 may be configured to generate aircraft datum 108 as a function of the measured aircraft data. An "aircraft datum," for the purpose of this disclosure, is any datum or collection of information describing parameters captured by sensor 104 which may include a collection of information describing the maneuvers made by a pilot operating the electric aircraft and any information of dynamic objects in a computer readable collection. A "dynamic object," for the purpose of this disclosure, is any moving or altering object that may affect the operation of the electric aircraft and it's systems. For example and without limitation, the dynamic object may include, incoming aircrafts, turbulence, air speed, air temperature, air pressure, buildings, trees, terrain, etc. In a non-limiting embodiment, aircraft datum 108 may be a standardized collection of data of the measured aircraft data, wherein aircraft datum 108 may include a plurality of categories denoting information about the electric aircraft and the like thereof. For example and without limitation, aircraft datum 108 may include, but is not limited to, the pilot input, the pilot command, and the like thereof. In a non-limiting embodiment, aircraft datum 108 may include any data captured by any sensor as described in the entirety of this disclosure. Additionally and alternatively, aircraft datum 108 may include any element or signal of data that represents crucial flight information captured during a plurality of flight phases the electric aircraft may experience as a function of the flight maneuvers. A "flight phase," for the purpose of this disclosure, is a phase of flight that may denote a transition of the movement of the electric aircraft. For example and without limitation, the pilot may maneuver the electric aircraft to roll, pitch, yaw, accelerate, decelerate, lift off, landing, etc. The maneuvers made by the electric aircraft during a flight phase or a transition of flight phase may significantly affect the electric aircraft and it's systems in which any operational data and/or measured aircraft data describing the electric aircraft during this process may be captured. In a non-limiting embodiment, the crucial flight information may include any data about the virtual environment of the simulated electric aircraft. In a non-limiting embodiment, aircraft datum 108 may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

Still referring to FIG. 1, computing device 112 may be configured to receive aircraft datum 108. In a non-limiting embodiment, computing device 112 may receive aircraft datum 108 as a function of a controller area network. Sensor 104 and/or computing device 112 may be communicatively connected using the controller area network. For instance and without limitation, the controller area network may be consistent with the controller area network in U.S. patent application Ser. No. 17/218,342 and titled, "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated by reference herein in its entirety. In a non-limiting embodiment, the controller area network may include a plurality of physical controller area network buses communicatively connected to the aircraft, such as the electric aircraft. A physical controller area network bus may be vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus components and/or constituent parts as described in further detail below. Physical CAN bus unit may include multiplex electrical wiring for transmission of multiplexed signaling. Physical CAN bus unit may include message-based protocol(s), wherein the invoking program sends a message to a process and relies on that process and its supporting infrastructure to then select and run appropriate programing. A plurality of physical CAN bus units located physically at the aircraft may include mechanical connection to the aircraft, wherein the hardware of the physical CAN bus unit is integrated within the infrastructure of the aircraft. Physical CAN bus units may be communicatively connected to the aircraft and/or with a plurality of devices outside of the aircraft. Physical CAN bus units may be mechanically connected to each other within an aircraft wherein physical infrastructure of the device is integrated into the aircraft for control and operation of various devices within the aircraft. Physical CAN bus unit may be communicatively connected with each other and/or to one or more other devices, such as via a CAN gateway. Communicatively connecting may include direct electrical wiring, such as is done within automobiles and aircraft. Communicatively connecting may include infrastructure for receiving and/or transmitting transmission signals, such as with sending and propagating an analogue or digital signal using wired, optical, and/or wireless electromagnetic transmission medium. In a non-limiting embodiment, each physical CAN bus unit may be configured to detect a measured state datum of a plurality of measured state data of aircraft. A "measured state datum," as used in this disclosure, is a datum that is collected via a CAN describing some functionality about aircraft. Measured state data may include a plurality of data signals detailing a control to one or more actuators communicatively connected to the aircraft. Measured state data may include a plurality of data entries relating aircraft pitch, roll, yaw, torque, angular velocity, climb, speed, performance, lift, thrust, drag, battery charge, fuel level, location, and the like. Measured state data may include a plurality of data communicating the status of flight control devices such as proportional-integral-derivative controller, fly-by-wire system functionality, aircraft brakes, impeller, artificial feel devices, stick shaker, power-by-wire systems, active flow control, thrust vectoring, alerion, landing gear, battery pack, propulsor, management components, control surfaces, sensors/sensor suites, creature comforts, inceptor, throttle, collective, cyclic, yaw pedals, MFDs, PFDs, and the like. Measured state data may exist as analogue and/or digital data, originating from physical CAN bus units such as bits, where a series of serial binary data are composed and transmitted relaying a measured state as indicated from a device located within, on, or communicating with aircraft.

With continued reference to FIG. 1, computing device 112 may be configured to generate a performance assessment model 116 as a function of aircraft datum 108. A "performance assessment model," for the purpose of this disclosure, an analytical and/or interactive visualization of information regarding the electric aircraft operation and/or performance capabilities of the electric aircraft. In a non-limiting embodiment, performance assessment model 116 may include a virtual representation of the electric aircraft. As described in this disclosure, "virtual representation" is a generated model or simulation accessible by computing device which is representative of a physical phenomenon. In a non-limiting embodiment, the virtual representation may include a model and/or simulation of the electric aircraft. For instance and without limitation, the virtual representation may be consistent with the virtual representation in U.S. patent application Ser. No. 17/348,916 and titled, "METHODS AND SYSTEMS FOR SIMULATED OPERATION OF AN ELECTRIC VERTICAL TAKE-OFF AND LANDING (EVTOL) AIRCRAFT," which is incorporated by reference herein in its entirety. The virtual representation may be simulated as a function of computing device 112 operating a flight simulator. A "flight simulator," for the purpose of this disclosure, is a program or set of operations that simulate flight. The flight simulator may be incorporated into the augmented reality device and/or computing device 112 of system 100. Alternatively or additionally, the flight simulator may be located remotely from system 100 of the electric aircraft and operated remotely by computing device 112. In some embodiment, the flight simulator may be consistent with the flight simulator in U.S. patent application Ser. No. 17/348,916 and titled, "METHODS AND SYSTEMS FOR SIMULATED OPERATION OF AN ELECTRIC VERTICAL TAKE-OFF AND LANDING (EVTOL) AIRCRAFT," which is incorporated by reference herein in its entirety. Additionally or alternatively, the flight simulator may simulate flight within an environment and/or a simulated environment, for example an environmental atmosphere in which aircraft fly, airports at which aircraft take-off and land, and/or mountains and other hazards aircraft attempt to avoid crashing into. This is so, at least in part, for pilot training purposes wherein system 100 may be incorporated into a simulator module instead of a real electric aircraft as described in the entirety of this disclosure. In some cases, an environment may include geographical, atmospheric, and/or biological features. In some cases, the flight simulator may model an artificial and/or virtual aircraft in flight as well as an environment in which the artificial and/or virtual aircraft flies. Persons skilled in the art, upon reviewing the entirety of this disclosure, will be aware of the various functions of utilizing a flight simulator in the context of simulation.

Still referring to FIG. 1, performance assessment model 116 may include a flight phase model of the electric aircraft. A "flight phase model," for the purpose of this disclosure, is a simulation and/or model of an electric aircraft that embodies an analytical and/or interactive visualization regarding at least a flight phase of aircraft operations and/or performance capabilities of the electric aircraft. For example and without limitation, the flight phase model may include a model depicting the power consumption for an entire flight or for one portion of a flight, a flight maneuver such as, but not limited to, a landing, a takeoff, a turn, an attitude shift, a change in angle of attack, and the like thereof. In another non-limiting example, the flight phase model may include a model depicting the electric aircraft making one or more stops at a charging station, a number of hours to be spent flying given a specific time requirement. In a non-limiting embodiment, the flight phase model may depict any flight that could be affected by any parameters described herein. In another non-limiting embodiment, the flight phase model may include any model depicting any maneuvers of the electric aircraft may make or has already made to complete a flight. Persons skilled in the art, upon reviewing the entirety of this disclosure, will be aware of the various embodiments of simulating a model based on various flight requirements and parameters for purposes as described herein.

With continued reference to FIG. 1, performance assessment model 116 may include computer-generated perceptual information, sometimes across multiple sensory modalities, including visual, auditory, haptic, somatosensory and olfactory senses. In a non-limiting embodiment, performance assessment model 116 may include enhanced visual information denoting any datum involving the electric aircraft and it's systems. In a non-limiting embodiment, augmented reality device, as a function of the HUD, may generate symbols, signs, images, indicators, etc., to display a plurality of data. For example and without limitation, the HUD may display a variety of visual indicators denoting components of performance assessment model 116 including a boresight and/or waterline symbol, which is fixed on the display of the HUD and may show where the nose of the electric aircraft is actually pointing. In another non-limiting example, the HUD may display, as a function of performance assessment model 116, a flight path vector (FPV) or velocity vector symbol configured to show where the electric aircraft is actually going, as opposed to merely where it is pointed as with the boresight. For example and without limitation, if the electric aircraft is pitched up but descending as may occur in high angle of attack flight or in flight through descending air, then the FPV symbol may be below the horizon even though the boresight symbol is above the horizon. During approach and landing, a pilot can fly the approach by keeping the FPV symbol at the desired descent angle and touchdown point on the runway. In another non-limiting example, the HUD may display, as a function of performance assessment model 116, an acceleration indicator or energy cue, which may be located to the left of the FPV symbol or above it if the electric aircraft is accelerating, and below the FPV symbol if the electric aircraft decelerating. In another non-limiting example, the HUD may display, as a function of performance assessment model 116, an angle of attack indicator configured to show the electric aircraft's wing's angle relative to the airflow using a sign/symbol such as "a". In another non-limiting example, the HUD may display, as a function of performance assessment model 116, a navigation data and/or symbols for approaches and landings, wherein computing device 112 may provide visual cues based on navigation aids (e.g. Instrument Landing System, augmented Global Positioning System, Wide Area Augmentation System, etc.). For example and without limitation, such visual cues may be denoted using a circle which fits inside the flight path vector symbol wherein the pilot can maneuver the electric aircraft along the correct flight path by "flying to" the guidance cue. In a non-limiting embodiment, the HUD may incorporate a plurality of enhanced systems including enhanced flight vision systems, synthetic vision systems, etc., to translate aircraft datum 108 into a visual format such as performance assessment model 116. Persons skilled in the art, upon reviewing the entirety of this disclosure, will be aware of the various enhanced systems, augmented reality devices, and visualizations for purposes as described herein.

With continued reference to FIG. 1, performance assessment model 116 may include a plurality of simulations of the electric aircraft using aircraft datum 108. In a non-limiting embodiment, the virtual representation of the electric aircraft of performance assessment model 116 may include a computer-generated silhouette of the electric aircraft, wherein unique systems of the electric aircraft may be highlighted by a scale of colors. For example and without limitation, the HUD may highlight systems of the electric aircraft that are operating satisfactorily and above with a green color outline. For example, the electric motors and vertical propulsors may be operating without issue or concern (which may be determined by any computer analysis performed by sensor 104 and/or computing device 112) as a function of a performance threshold and highlight the outlines of the silhouette of the electric aircraft with the color green which may be displayed onto the HUD and viewed by the pilot. In another example, computing device 112 and/or sensor 104 may detect and conclude that the battery pack of the electric aircraft may be faulty, risky, in need of replacement/repairs, etc., or requiring imminent attention, wherein the HUD may display a red color outlining the battery pack of the silhouette of the electric aircraft. In a non-limiting embodiment, computing device 112 may determine the status of systems of the electric aircraft based on the performance threshold and categorize the quality of the operational levels of the system of the electric aircraft into different color groups, wherein systems that are classified as potentially faulty, subpar in quality, etc. may be classified as such and associated with a red color. Systems that are of adequate, acceptable, and/or average quality may be associated with a yellow color. Systems that are exceptional, high quality, and/or least likely to be damaged or cause damage may be associated with the color green. Persons skilled in the art, upon reviewing the entirety of this disclosure, will be aware of the various embodiments and classifications of colors in the context of denoting performance qualities of electric aircraft systems for purposes as described herein.

Still referring to FIG. 1, a "performance threshold," for the purpose of this disclosure, is a quantifiable magnitude of performance that a system must exceed, stay below, and/or reach for a certain phenomenon to occur. The performance threshold may include a standard deviation that may distinguish the performances of the systems of the electric aircraft from adequate, average, or acceptable to either severely above average or severely below average in performance quality. For example and without limitation, the performance threshold may include a variety of metrics denoting a satisfactory level of performance for different or unique electric aircraft systems. In a non-limiting embodiment, the performance threshold may include an upper level of 35 degrees Celsius and a lower level of 15 degrees Celsius for classifying the performance of the battery pack of the electric aircraft. The performance threshold may also include a standard deviation of 7 degrees Celsius. For example and without limitation, if the battery pack has a temperature below 15 degrees Celsius or above 35 degrees Celsius, computing device 112 may classify the battery pack with a red color in which the silhouette of the electric aircraft to be displayed by the HUD may include an outline of the battery pack with a red color. If the battery pack temperature is 7 degrees from the median of the upper and lower levels, computing device 112 may classify the battery pack with a yellow color to be displayed around the battery pack outlines of the silhouette to be displayed on the HUD. If the battery pack temperature is within 7 degrees Celsius of the median of the upper and lower levels, computing device 112 may classify the battery pack with a green color to be displayed around the battery pack of the silhouette. Similar analysis, grading, and/or classification procedures may be applied for various electric aircraft systems with reasonable performance metrics and thresholds as to which a persons skilled in the art, upon reviewing the entirety of this disclosure, will understand. The performance threshold may be modified.

Still referring to FIG. 1, performance assessment model 116 may include dashboards and reports involving the electric aircraft and it's systems. In a non-limiting embodiment, performance assessment model 116 may be identified as a function of a consumer tool. A "consumer tool," for the purposes of this disclosure, refer to a computer program that is used to facilitate commercial applications. Commercial applications may include, but not limited to, delivery of cargo, transportation of passengers, and the like thereof. The consumer tool may include a load calculation, optimization of package deliveries, and the like thereof. In a non-limiting embodiment, computing device 112 may operate the consumer tool to generate, in part, performance assessment model 116. In a non-limiting embodiment, computing device 112 may integrate a plurality of consumer tools into the augmented reality device of system 100. In another non-limiting embodiment, the consumer tool may be used to store, retrieve, and view a plurality of information regarding the logistics of commercial applications. In a non-limiting embodiment, a customer may use the consumer tool to optimize the delivery of packages and/or cargo. For example, the consumer tool may perform various optimization algorithms and calculations to complete a delivery or flight request. A person of ordinary skill in the art, after viewing the entirety of this disclosure, would appreciate the purpose of a consumer tool in the context of commercial applications.

Still referring to FIG. 1, computing device 112 may include at least a hooking procedure configured to integrate additional functionalities with existing subsystems of the electric aircraft and/or computing device 112 including the consumer tool . A "hooking procedure," for the purposes of this disclosure, refer to a plurality of techniques used to alter the behavior of operating systems, applications, and other software components. In a non-limiting embodiment, computing device 112 may be configured to perform debugging and extending functionality of a subsystem including a consumer tool . In another non-limiting embodiment, computing device 112 may intercept user input such as a keyboard or mouse event from the consumer tool before the consumer tool may be used to impact the generating of performance assessment model 116. In a non-limiting embodiment, flight controller 120 may perform benchmarking programs to measure quantifiable information of existing systems such as the consumer tool. A person of ordinary skill in the art, after viewing the entirety of this disclosure, would appreciate the range of techniques used to augment existing applications into the overall system in the context of management.

Still referring to FIG. 1, performance assessment model 116 may include a plurality of datum to be visualized, viewed, and displayed onto a platform such as the HUD, exterior view window 120, etc., of the augmented reality device of system 100 of the electric aircraft. In a non-limiting embodiment, the plurality of datum to be displayed for the pilot to view may be generalized, computed, and/or translated into readable text. For example and without limitation, computing device 112 may summarize aircraft datum 108 and generate textual phrases, words, sentences, or in any concise form, to describe the performance and qualities of the systems of the electric aircraft denoted by the plurality of datum included in performance assessment model 116. This is so, at least in part, to provide the pilot enough information or at least only the more important piece of information of the electric aircraft without impeding the field of vision of the pilot with superfluous text, images, data, etc. Persons skilled in the art, upon reviewing the entirety of this disclosure, will be aware of the various embodiments of translation of data for multi-tasking and analysis purposes as described herein.

With continued reference to FIG. 1, performance assessment model 116 may include a battery system datum 136. A "battery system datum," for the purpose of this disclosure, is a collection of information describing the performance of the battery of the electric aircraft. In a non-limiting embodiment, battery system datum 136 may include details, data, and/or metrics related to the operating status of the battery of the electric aircraft at any stages during flight. For example and without limitation, battery system datum may include numbers, percentages, texts, etc., describing the battery performance and quality of the electric aircraft including, but not limited to, remaining battery capacity, power consumption rate, battery temperature, etc., or the combination thereof. In a non-limiting embodiment, battery system datum may be identified within the HUD by indicators such as lines and/or arrows pointing to the portion of the silhouette of the electric aircraft (generated by the flight simulator and also displayed onto the HUD) that the battery and/or battery system is located in relative to the electric aircraft and/or silhouette.

Still referring to FIG. 1, performance assessment model 116 may include an aircraft health datum 140. An "aircraft health datum," for the purpose of this disclosure, is a collection of information describing the state of health of the actuators of the electric aircraft. In a non-limiting embodiment, aircraft health datum 140 may include metrics describing propulsors, propellors, electric motors, rotors, etc., of the electric aircraft. Such metrics may be represented as images, numbers, percentages, text, etc., and may be identified within the HUD by indicators such as lines and/or arrows pointing to the portion of the silhouette of the electric aircraft (generated by the flight simulator and also displayed onto the HUD) that the respective actuators are located in relative to the electric aircraft and/or silhouette.

Still referring to FIG. 1, performance assessment model 116 may include a flight plan datum 144. A "flight plan datum," for the purpose of this disclosure, is a collection of information describing the flight plan of the electric aircraft. The flight plan may include the path the electric aircraft is supposed to follow. Flight plan datum 144 may be represented using numbers, percentages, images, text, etc. In a non-limiting embodiment, flight plan datum 144 may include information such as distance remaining to destination location, distance already flown, electric aircraft velocity, estimated time of arrival, etc., or the combination thereof. In a non-limiting example, flight plan datum 144 may be identified within the HUD by arrows, lines, symbols, etc. denoting the path to be followed for the pilot to visually comprehend and follow.

Still referring to FIG. 1, performance assessment model 116 may include a performance alert datum 148. A "performance alert datum," for the purpose of this disclosure, is A "performance alert," for the purpose of this disclosure, is a collection of information indicating an abnormal event. The abnormal event may include any external factors including weather, turbulence, other flying objects, etc. In a non-limiting embodiment, the abnormal event may include any systems of the electric aircraft that may be underperforming or at risk of damaging the electric aircraft. In another non-limiting embodiment, performance alert datum 148 may include a warning sign indicating increment weather, unusually high turbulence, a flight highway with considerable traffic, and the like thereof. In a non-limiting embodiment, performance alert datum 148 may be depicted in a graphical format. Performance alert 148 may include a plurality of colors, sizes, texts, numbers, images, and associated sounds configured to attract the attention of the pilot. For example, a new and/or unexpected issue involving any actuator and/or systems of the electric aircraft may occur during a flight regarding a flight component, an electric aircraft personnel, pilot, passenger, cargo, and the like thereof. In a non-limiting embodiment, computing device 112 may be configured to record a plurality of data during an occurrence of an issue or during an occurrence of a predictive issue that may occur. In a non-limiting embodiment, performance alert datum 148 may include a plurality of performance alerts for each major flight component. For instance, a performance alert datum 148 may flash and alert a user during an occurrence of a failure or degradation of a flight component during flight, before takeoff, after landing, and the like thereof. In a non-limiting embodiment, performance alert datum 148 may be triggered when an obstructive outside parameter is detected. In a non-limiting embodiment, performance alert datum 148 may include a generated box to highlight incoming objects, which may be detected and pinpointed by computing device 112 and/or sensor 104, and inform the pilot of such objects to be wary of. A person of ordinary skill in the art, after viewing the entirety of this disclosure, would appreciate the function of an alert in the context of detecting, avoiding, and analyzing unexpected and potentially hazardous obstacles and/or issues.

With continued reference to FIG. 1, performance assessment model 116 may include a plurality of histories, records, and schedules regarding the health status, maintenance, quality, and the like thereof, of the components of an electric aircraft. In a non-limiting embodiment, performance assessment model 116 may further be configured to include a health projection for the electric aircraft and its components, systems, etc. A "health projection," for the purpose of this disclosure, is a predictive model of the health status the electric aircraft and any of its components or subsystems. Performance assessment model 116 include information describing the maintenance, repair, and overhaul of an electric aircraft or an electric aircraft's flight components. For example and without limitation, the pilot may want to modify what is being displayed on the HUD and may pull up (using the pilot control or pilot device 140) information such as a record of maintenance activities and their results including a plurality of tests, measurements, replacements, adjustments, repairs, and the like, that may be intended to retain and/or restore a functional unit of the electric aircraft. In a non-limiting embodiment, all information and/or datum received by computing device 112 may be stored in a performance database 156. This is so, at least in part, for the pilot to view alternative information or data stored in a memory that may not be crucial flight information. A "performance database," for the purpose of this disclosure, is a data storage system configured to store all instances of data measured, captured, analyzed, generated, etc. In a non-limiting embodiment, the pilot may view previously recorded and/or stored information onto the HUD for various purposes.

Still referring to FIG. 1, the augmented reality device and/or computing device 112 may be configured to generate and/or classify components of performance assessment model 116 using a performance classifier 152. A "performance classifier," for the purpose of this disclosure, is a machine-learning model used to classify the performances of the electric aircraft and its systems and generate a plurality of models denoting the classification. In a non-limiting embodiment, computing device 112 may train performance classifier 152 using a performance training data. A "performance training data," for the purpose of this disclosure, is an element of aircraft datum correlated to an element of performance assessment model. The performance training data may be retrieved from any past training data stored in performance database 156. In a non-limiting embodiment, performance classifier 152 may generate performance assessment model 116 using the performance training data, and aircraft datum 108 and/or the performance threshold as inputs. For example and without limitation, the performance training data may correlate an element of aircraft datum to an element of battery system datum, in which performance classifier 152 may use the performance threshold to color label for the outlining of the simulated electric aircraft silhouette based on the performance of the battery of the electric aircraft. In another non-limiting example, the performance training data may correlate an element of past aircraft datum to an element of past aircraft health datum, wherein the element of past aircraft datum may denote a torque value. Performance classifier 152 may correlate the torque value to a category of quality based on the torque value. Persons skilled in the art, upon reviewing the entirety of this disclosure, will be aware of the various embodiments of training data and data correlation for a plurality of aircraft metrics for purposes as described herein.

With continued reference to FIG. 1, performance assessment model 116 may include a relevant to the operation of the electric aircraft. For example and without limitation, performance assessment model 116 may include multifunctional information that is operator selectable, primary flight data, for instance one or more of an attitude indicator (AI), stall angle, a runway diagram, ILS localizer and glide-path "needles", aircraft's future path, airspeed and altitude indicators, aircraft's altitude above mean sea level (AMSL), heading, current heading, current track (actual path over the ground), rate of turn, current heading setting on the autopilot, navigational marker information, bugs (to control the autopilot), ILS glideslope indicators, course deviation indicators, altitude indicator QFE settings, and the like, electric vehicle data, including motor health, motor temperature, motor rpm, motor current draw, inverter health, inverter temperature, inverter current draw, and the like, and battery data, for instance battery state of charge, battery state of health, metrics derived from battery charge (e.g., fuel gauge), battery temperature, battery cell pressure, and the like thereof.

Still referring to FIG. 1, computing device 112 may be configured to project performance assessment model 116 onto exterior view window 112 and/or the HUD using a projection device 144. A "projection device," for the purpose of this disclosure, is an optical device configured to project an image into a field of vision or any surface. In a non-limiting embodiment, projection device 144 may include any software and/or hardware component that adds inserted images into an exterior view window 120 signal to be rendered on the exterior view window 120. Projection device 144 may include any projector consistently described in the entirety of this disclosure. In a non-limiting embodiment, projection device 144 may make use of reflective waveguides, diffractive waveguides, or the like to transmit, project, and/or exterior view window 120 images. For instance, and without limitation, projection device 144 may project images through and/or reflect images off an eyeglass-like structure and/or lens piece, where either both field of vision and images from projection device 144 may be displayed, or the former may be permitted to pass through a transparent surface. Projection device 144 may be incorporated in a contact lens or eye tap device, which may introduce images into light onto exterior view window 120 to display such images. Projection device 144 project some images using a virtual retina display (VRD), which may display an image directly on exterior view window 120 to be viewed by a pilot. Persons skilled in the art, upon reviewing the entirety of this disclosure, will be aware of the various ways of displaying an image onto a surface for viewing and for purposes as described herein.

With continued reference to FIG. 1, projection device 144 may include a plurality of projection devices. In a non-limiting embodiment, the cockpit of the electric aircraft may include four projection device 144. Projection device 144 may be configured to simulate a pilot's point of view in an electric aircraft within a simulated environment. In a non-limiting embodiment, each projection device of the four projection devices may project unique images where each image may be blended, aligned, and/or layered on each other to produce a seemingly single image. For example and without limitation, one projection device may be configured to project images of the sky of a simulated environment from the pilot's point of view. A second projection device may be configured to project images of objects in the sky of the simulated environment such as, but not limited to, clouds, other flying objects, birds, and the like thereof. A third projection device may be configured to display simulated obstacles such as buildings, natural terrain, mountains, and the like thereof. A fourth projection device may be configured to project related flight data such as, but not limited to, altitude, airspeed, vertical speed, heading, angle of attack, and any other flight related measurements. In a non-limiting embodiment, each projection device may be configured to project a unique model and/or component included in performance assessment model 116. Persons skilled in the art, upon reviewing the entirety of this disclosure, will be aware of the various simulated objects and images that a pilot may view in the point of view of the pilot flying an electric aircraft and the various perceptual images the pilot may require and/or need that any augmented reality device may employ for purpose as described herein.

Still referring to FIG. 1, projection device 144 may be configured to display a different relevant information to the operation of the electric aircraft. A "different relevant information," for the purpose of this disclosure, is a collection of information that may be prioritized in the displaying of based on the flight phase of the electric aircraft. For example and without limitation, during lift off of the electric aircraft, performance assessment model 116, as a function of computing device 112, may prioritize the datum and/or model describing the performance and quality of the actuators of the electric aircraft and display them in a manner to grab the attention of the pilot by means of enlarging, highlighting using distinguishing colors, moving to the central point of the field of vision of the pilot, etc., of aircraft health datum 140. Computing device 112 may also increase the transparency of the other datum and/or models during the lift off flight phase. In another non-limiting embodiment, during the flight phase of the electric aircraft cruising, computing device 112 may prioritize flight plan datum 144 and/or battery system datum 116 to constantly inform the pilot of the power consumption rate, remaining battery, estimated time of arrival, remaining distance to be travelled, etc. In another non-limiting example, the electric aircraft may be experiencing various turbulence and weather conditions in which computing device 112 may prioritize the presentation of performance alert datum 148 and aircraft health datum 140. For example and without limitation, the HUD may present crucial flight information involving the actuators of the electric aircraft and external factors which the pilot may require to monitor while maneuvering the electric aircraft during this phase and/or condition. In a non-limiting embodiment, the pilot may manually select which flight information of performance assessment model 116 may be presented on the HUD and/or exterior view window 120. The pilot may manually control the visual presentations of the HUD and/or exterior view window 120 using the pilot control and/or pilot device 140. This may include moving various simulated models and generated data, text, images, symbols, etc., around the display of the HUD and/or exterior view window 120 of the augmented reality device. Persons skilled in the art, upon reviewing the entirety of this disclosure, will be aware of the various significance of flight information for various stages of flight for purposes as described herein.

Figure 2:
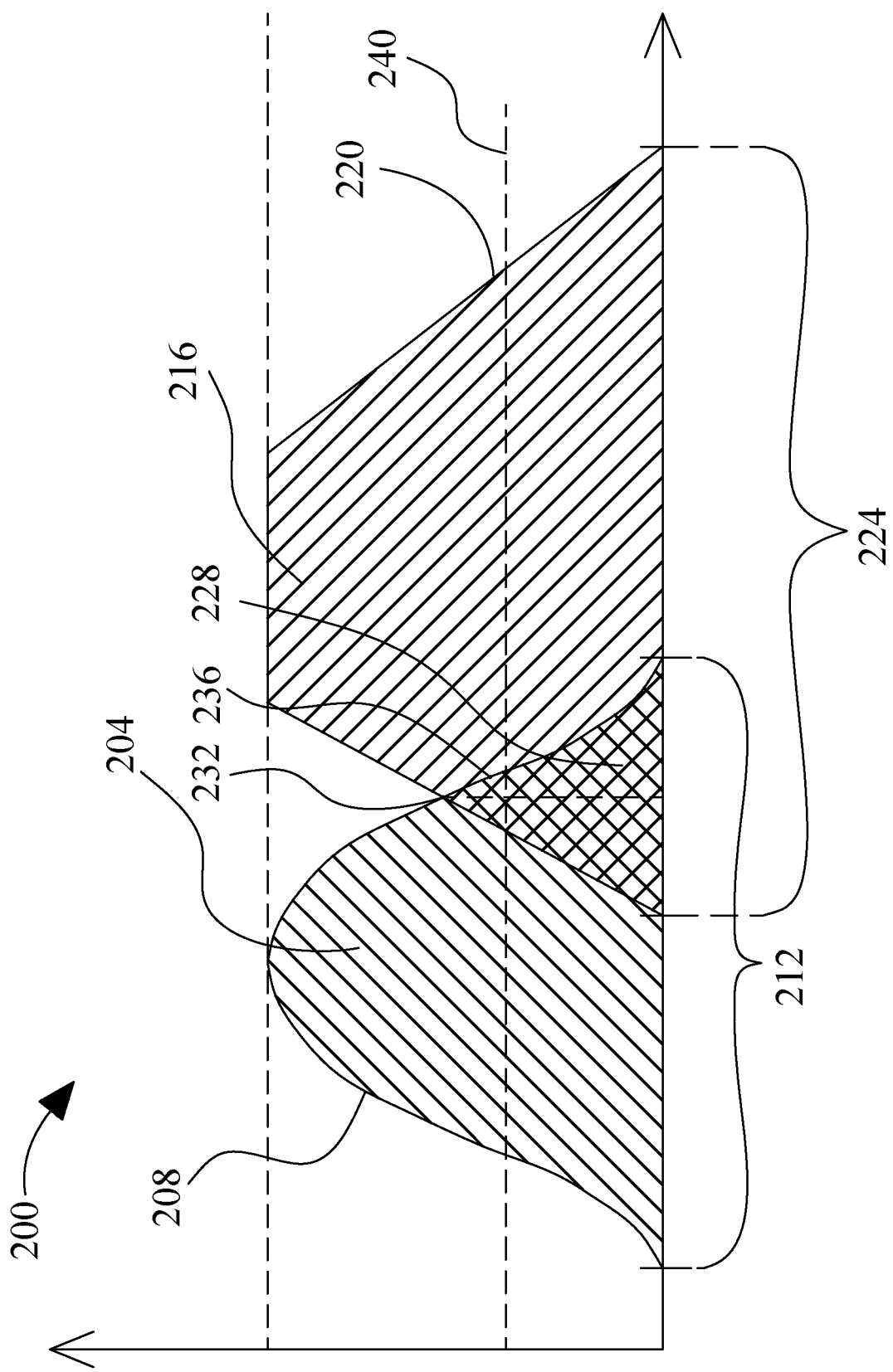
FIG. 2 is an illustration of an exemplary embodiment of a fuzzy set for a performance threshold.

Now referring to FIG. 2, an exemplary embodiment of a fuzzy set 200 for a performance threshold is illustrated. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 204 may represent any value or combination of values as described above, including predictive prevalence value, probabilistic outcome, any resource datum, any niche datum, and/or any combination of the above. A second fuzzy set 216, which may represent any value which may be represented by first fuzzy set 204, may be defined by a second membership function 220 on a second range 224; second range 224 may be identical and/or overlap with first range 212 and/or may be combined with first range via Cartesian product or the like to generate a mapping permitting evaluation overlap of first fuzzy set 204 and second fuzzy set 216. Where first fuzzy set 204 and second fuzzy set 216 have a region 328 that overlaps, first membership function 208 and second membership function 220 may intersect at a point 232 representing a probability, as defined on probability interval, of a match between first fuzzy set 204 and second fuzzy set 216. Alternatively or additionally, a single value of first and/or second fuzzy set may be located at a locus 236 on first range 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, the threshold may indicate a sufficient degree of overlap between a plurality of data including any data and/or datum related to the performance of the electric aircraft and it's components as described above. There may be multiple thresholds; for instance, for various systems of the electric aircraft such as the battery system, a propulsion system, a motor system, etc. Each threshold may be established by one or more user inputs or automatically by a flight controller. Each threshold may be determined using any training data that correlates an element of the aircraft datum to an element of the performance assessment model that may include any performance and/or quality of the electric aircraft as a function of a machine-learning model such as performance classifier 152.

Still referring to FIG. 2, in an embodiment, a degree of match between fuzzy sets may be used to rank one performance metric to another. Where multiple fuzzy matches are performed, degrees of match for each respective fuzzy set may be computed and aggregated through, for instance, addition, averaging, or the like, to determine an overall degree of match, which may be used to rank the performance of the electric aircraft and its components; ranking may be a form of classifying and/or categorizing the various performances to a color range as described above.

Figure 3:
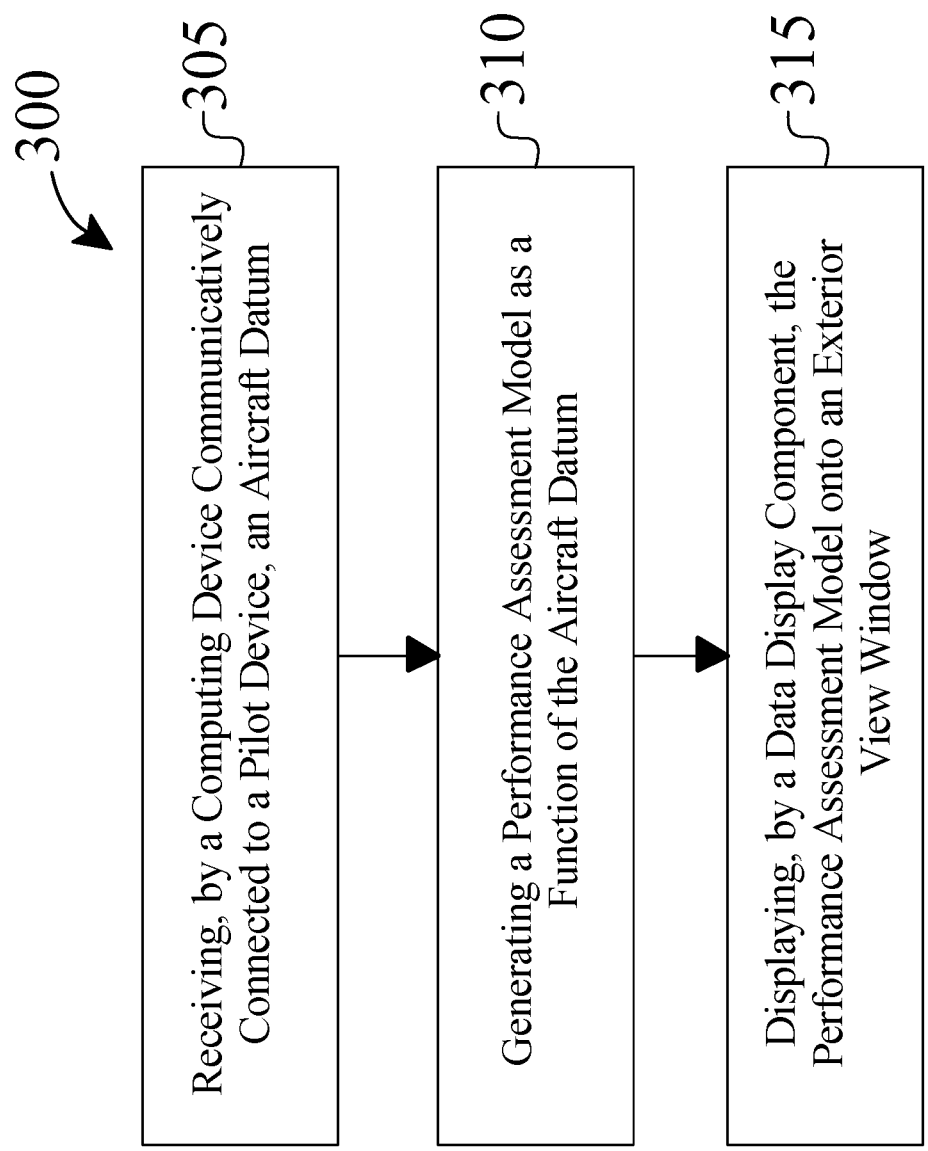
FIG. 3 is a flow chart of an exemplary embodiment of a method for a head-up display for an electric aircraft.

Referring now to FIG. 3, a flow chart of an exemplary embodiment of a method 300 for a head-up display for an electric aircraft is provided. The electric aircraft may include any electric aircraft as described in the entirety of this disclosure. Method 300, at step 305, may include receiving, by a computing device communicatively connected to a pilot device an aircraft datum. The computing device may be consistent with any computing device as described in the entirety of this disclosure. The aircraft datum may be consistent with any aircraft datum as described in the entirety of this disclosure. In a non-limiting embodiment, method 300 may include detecting, by a sensor communicatively connected to the pilot device, measured aircraft data and generating the aircraft datum as a function of the measured aircraft data. The sensor may be consistent with any sensor as described herein. In a non-limiting embodiment, detecting the measured aircraft data may include focusing on specific objects within the scope of the sensor. The measured aircraft data may be consistent with any measured aircraft data as described herein. The pilot device may be consistent with any pilot device as described in the entirety of this disclosure. In a non-limiting embodiment, the pilot device may be communicatively connected to a pilot control. The pilot control may be consistent with any pilot control as described herein. In a non-limiting embodiment, method 300 may include detecting any inputs and maneuvers performed by the pilot in the generating of the aircraft datum. Persons skilled in the art, upon reviewing the entirety of this disclosure, will be aware of the various embodiments and methods of a computing device receiving a plurality of data for purposes as described herein.

Still referring to FIG. 3, method 300, at step 310, may include generating a performance assessment model as a function of the aircraft datum. The performance assessment datum may be consistent with any performance assessment model as described herein. In a non-limiting embodiment, method 300 may include operating a flight simulator to simulate a plurality of virtual representations including models depicting the aircraft datum. The flight simulator may be consistent with any flight simulator as described herein. The virtual representation may be consistent with any virtual representation as described herein. In a non-limiting embodiment, method 300 may include generating the performance assessment model as a function of a performance classifier and/or performance threshold. The performance classifier may be consistent with any performance classifier and/or machine-learning model as described herein. The performance classifier may be trained using a performance training data which may be retrieved from a performance database. The performance training data may include any performance training data as described herein. The performance database may include any performance database as described herein. In a non-limiting embodiment, the computing device may use the performance threshold to compare the plurality of data received to determine the quality of the performance of the electric aircraft. The performance threshold may include any performance threshold as described herein.

Still referring to FIG. 3, method 300, at step 315, may include displaying, by a data display component, the performance assessment model onto an exterior view window. The exterior view window may be consistent with any exterior view window as described in the entirety of this disclosure. The data display component may be consistent with any data display component as described in this disclosure. In a non-limiting embodiment, the data display component may include one or more projection devices. The projection device may be consistent with any projection device as described herein. In a non-limiting embodiment, projecting the performance assessment model may include projecting various models using one or more projection devices configured to layer the image displayed onto the exterior view window. The exterior view window may include any exterior view window as described herein. In a non-limiting embodiment, the projection device and exterior view window may be incorporated into an augmented reality device. The augmented reality device may include any augmented reality device as described herein. In a non-limiting embodiment, the computing device may determine which component of performance assessment model is to be displayed. In another non-limiting embodiment, the pilot may control the displaying of the performance assessment model manually.

Still referring to FIG. 3, the method may include, the exterior view window configured to incorporate a HUD. The HUD may be consistent with any HUD as described herein. In a non-limiting embodiment, the exterior view window may be a transparent glass that the pilot may view the surroundings of the aircraft, in which the projection device may project the enhanced images of performance assessment model onto the exterior view window. In a non-limiting embodiment, the HUD may be the exterior view window. Persons skilled in the art, upon reviewing the entirety of this disclosure, will be aware of the various embodiments and methods of displaying enhanced and computer-generated images for augmented reality purposes as described herein.

Figure 4:
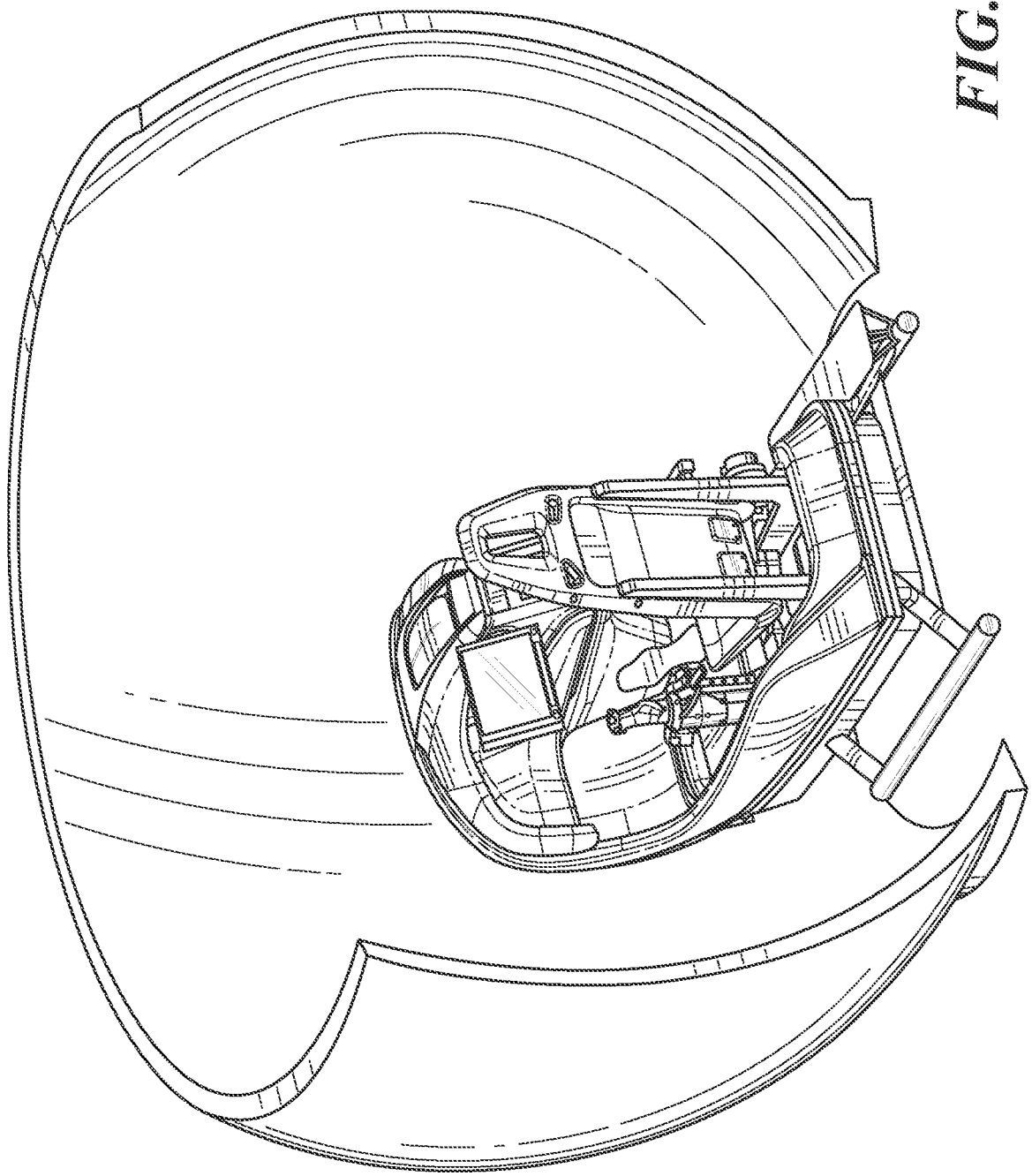
FIG. 4 is a diagrammatic representation of an exemplary embodiment of an exterior view window.

Referring now to FIG. 4, a diagrammatic representation of an exemplary embodiment of an exterior view window is illustrated. The diagrammatic representation includes the exterior view window extending around a pilot seat and controls. In a non-limiting embodiment, the exterior view window may be concave in shape and extend around and/or towards the pilot to provide maximum visibility of outside elements allowable in consideration of the entire structure of the electric aircraft in which the exterior view window is incorporated within. The exterior view window may include a windshield that protects the pilot and various electrical systems housed inside the electric aircraft from the outside elements. The exterior view window may incorporate augmented reality which may provide the pilot with enhanced computer-generated information. In a non-limiting embodiment, the exterior view window may incorporate a plurality of projection devices, that may project the computer-generated images onto the surface of the exterior view window. For example and without limitation, the exterior view window may include a plurality of electrical devices that may be used to project images onto the surface of the exterior view window, wherein the plurality of electrical devices are housed inside a layer within the exterior view window. In another example, the projection devices may be placed above the pilot and pointed towards a surface on the exterior view window to display onto the surfaces a plurality of computer-generated information and/or images. Persons skilled in the art, upon reviewing the entirety of this disclosure, will be aware of the various embodiments and configurations of the exterior view window used for displaying information and providing visibility.

Figure 5:
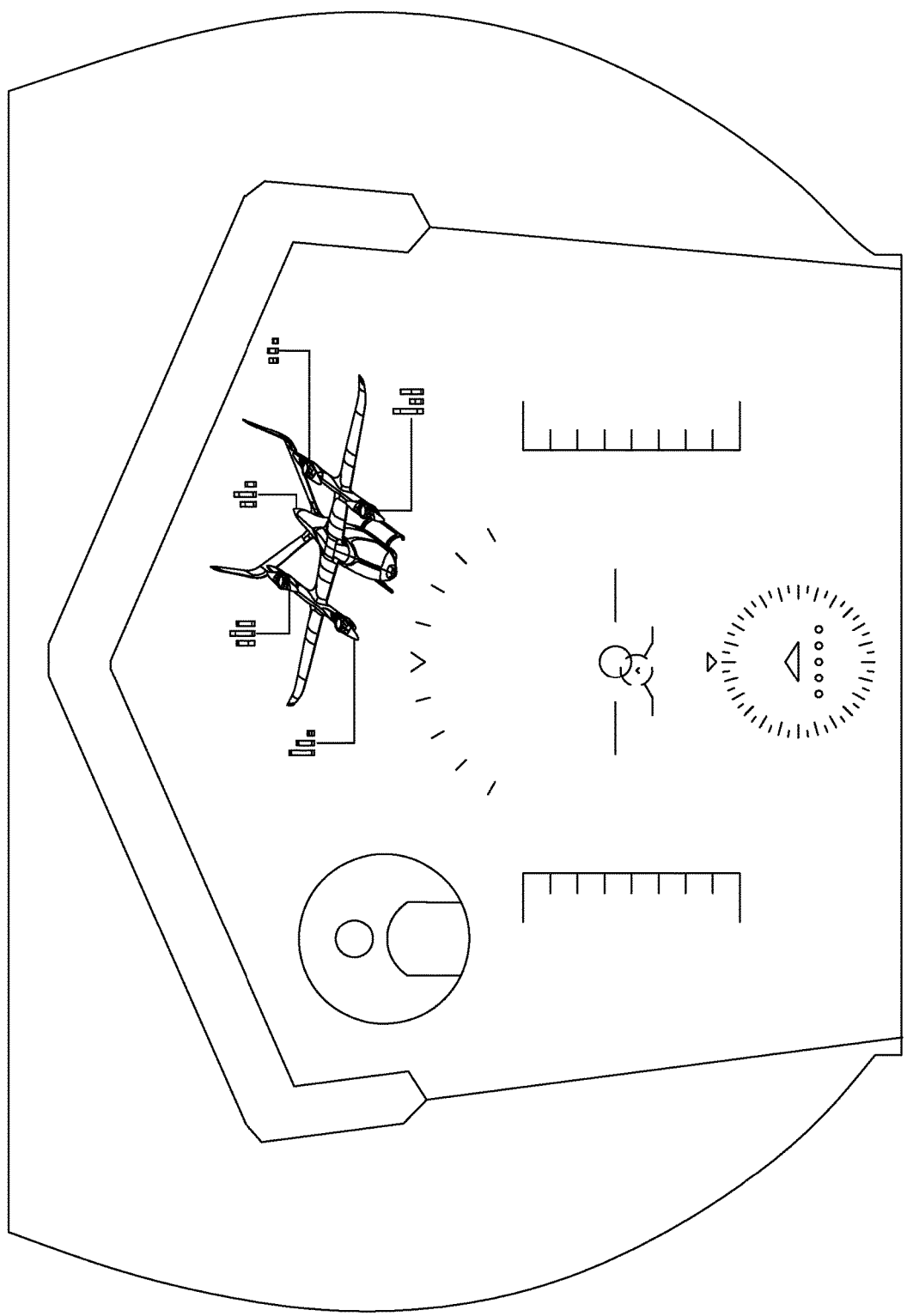
FIG. 5 is a diagrammatic representation of an exemplary embodiment of a head-up display.

Now referring to FIG. 5, a diagrammatic representation of an exemplary embodiment of a head-up display is illustrated. The head-up display(HUD) may include a separate device that includes a transparent screen configured to display computer generated images and/or information. In a non-limiting embodiment, the HUD may be placed in front of the pilot wherein the pilot may view the information displayed on the HUD. In a non-limiting embodiment, the HUD may be placed between the pilot and the central point of the exterior view window, wherein the exterior view window is configured to provide visibility of the outside environment while the HUD is configured to display information, wherein the information is related to the outside environment. The pilot may view the information and the outside environment with minimal bodily movement of the head of the pilot. The HUD may include a plurality of lines, images, symbols, etc. as illustrated in FIG. 5. The lines, images, and symbols may be used to denote the current position, direction, location, etc., of the electric aircraft. The HUD may further display information describing the electric aircraft and its functionalities in real-time. The HUD may include alternative information related to communication. The HUD may include one or more projection devices within the HUD and/or screen of the HUD to display the flight information. Persons skilled in the art, upon reviewing the entirety of this disclosure, will be aware of the various embodiments various flight information may be displayed and placed on the HUD for purposes as described herein.

Figure 6:
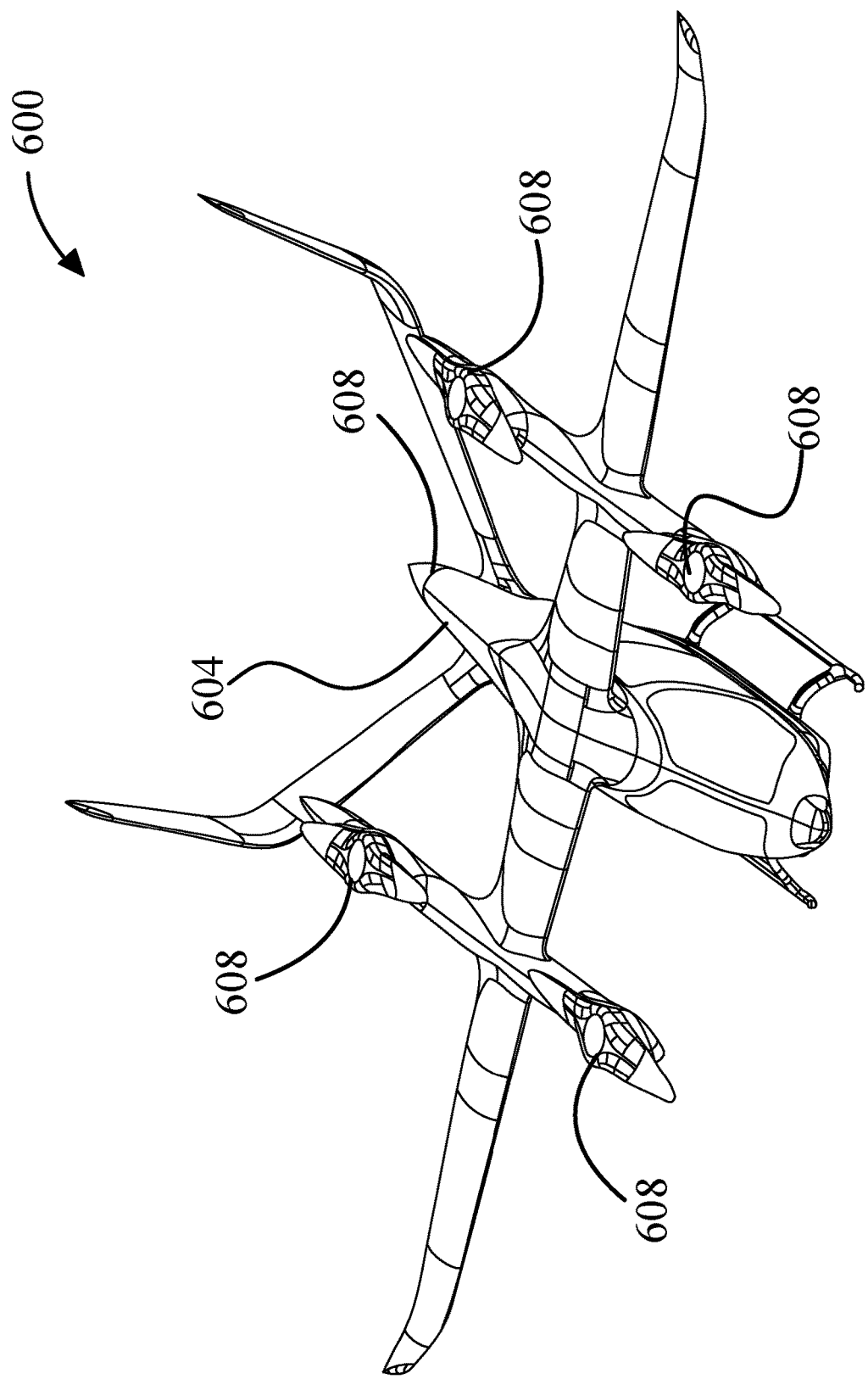
FIG. 6 is a diagrammatic representation of an exemplary embodiment of an electric aircraft.

Referring now to FIG. 6, an exemplary embodiment of an aircraft 600 is illustrated. In an embodiment, aircraft 600 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 600 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, and titled "AN INTEGRATED ELECTRIC PROPULSION ASSEMBLY," the entirety of which is incorporated herein by reference.

With continued reference to FIG. 6, as used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 600, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 6, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 604 may include structural elements that physically support a shape and structure of an aircraft. Structural elements may take a plurality of forms, alone or in combination with other types. Structural elements may vary depending on a construction type of aircraft such as without limitation a fuselage 604. Fuselage 604 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 6, aircraft fuselage 604 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 604 orthogonal to a longitudinal (nose to tail) axis of the aircraft and may form a general shape of fuselage 604. A former may include differing cross-sectional shapes at differing locations along fuselage 604, as the former is the structural element that informs the overall shape of a fuselage 604 curvature. In embodiments, aircraft skin may be anchored to formers and strings such that the outer mold line of a volume encapsulated by formers and stringers includes the same shape as aircraft 600 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

Still referring to FIG. 6, aircraft 600 may include a plurality of flight components 608. As used in this disclosure a "flight component" is a component that promotes flight and guidance of an aircraft. In an embodiment, flight component 608 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 6, plurality of flight components 608 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis.

In an embodiment, and still referring to FIG. 6, plurality of flight components 608 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 6, plurality of flight components 608 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1045 N to force aircraft to in a horizontal direction along the longitudinal axis. As a further non-limiting example, pusher component may twist and/or rotate to pull air behind it and, at the same time, push aircraft 600 forward with an equal amount of force. In an embodiment, and without limitation, the more air forced behind aircraft, the greater the thrust force with which aircraft 600 is pushed horizontally will be. In another embodiment, and without limitation, forward thrust may force aircraft 600 through the medium of relative air. Additionally or alternatively, plurality of flight components 608 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 7:
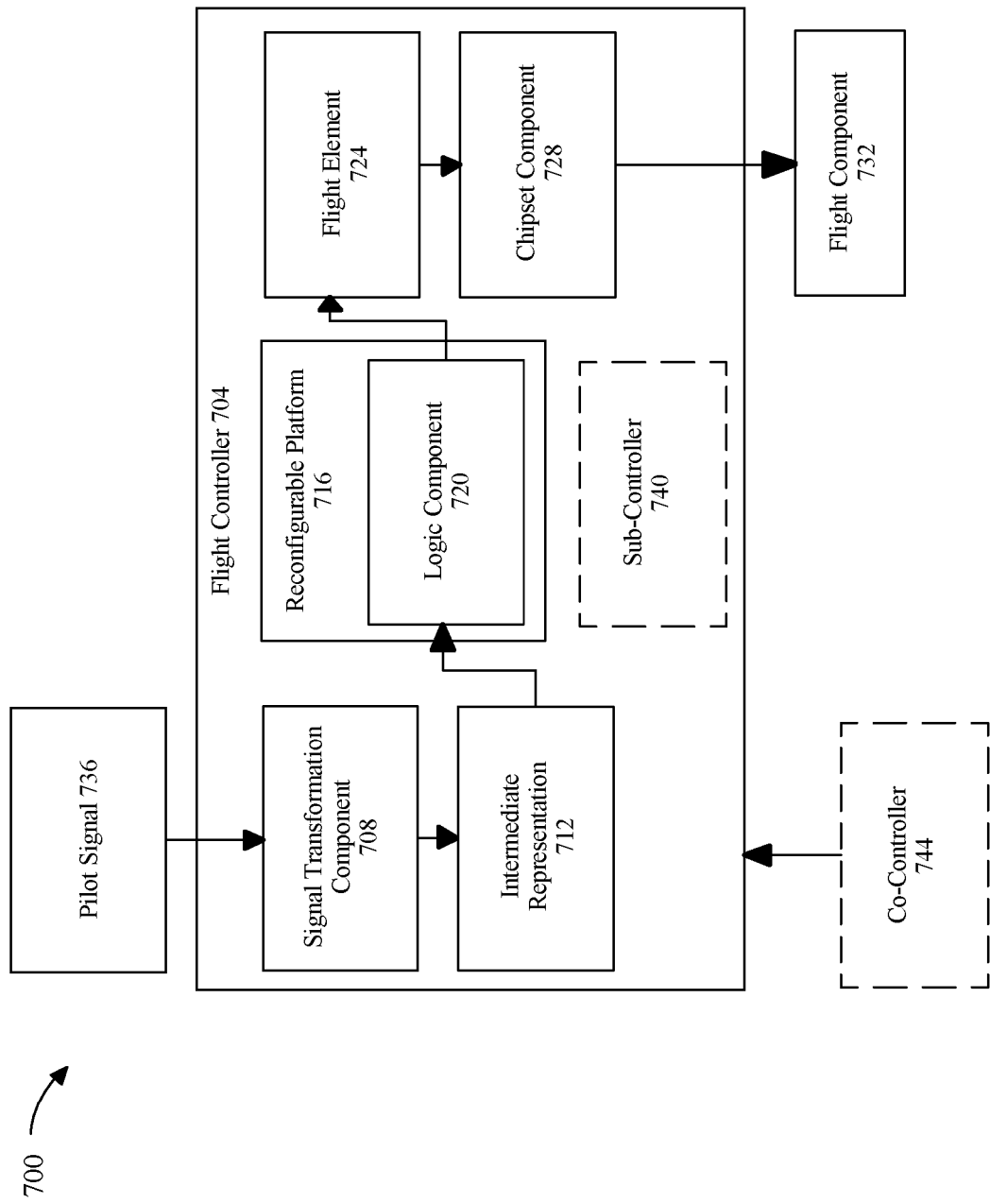
FIG. 7 is a block diagram of an exemplary flight controller.

Now referring to FIG. 7, an exemplary embodiment 700 of a flight controller 704 is illustrated. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 7-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q-k-1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above. In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 8:
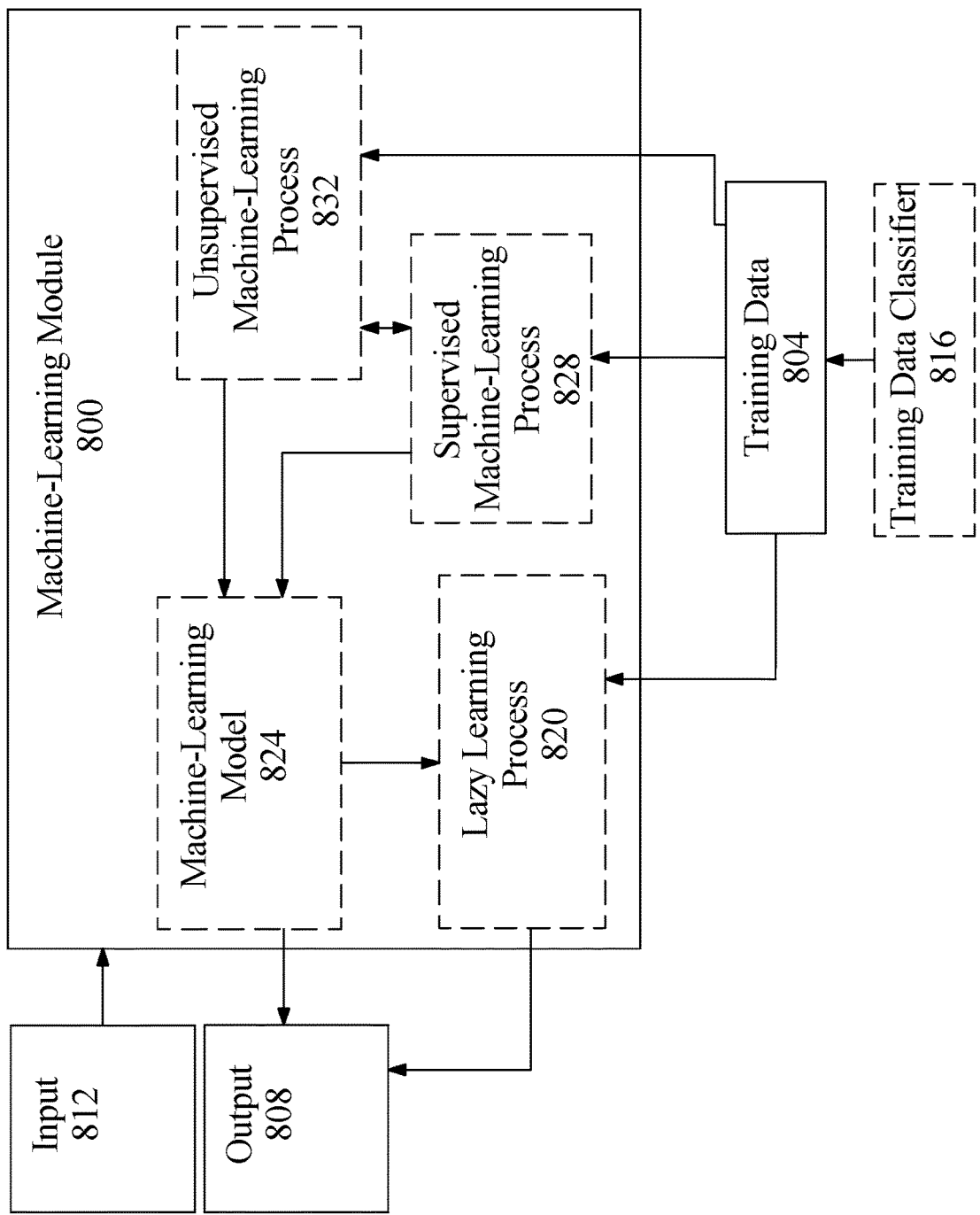
FIG. 8 is a block diagram of an exemplary machine-learning process.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example the aircraft datum may be an input and the performance assessment model may be an output.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 816 may classify elements of training data to categories of quality of the performance of the electric aircraft and associated colors for which a subset of training data may be selected.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include the aircraft datum, as described above as inputs, the performance assessment model as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
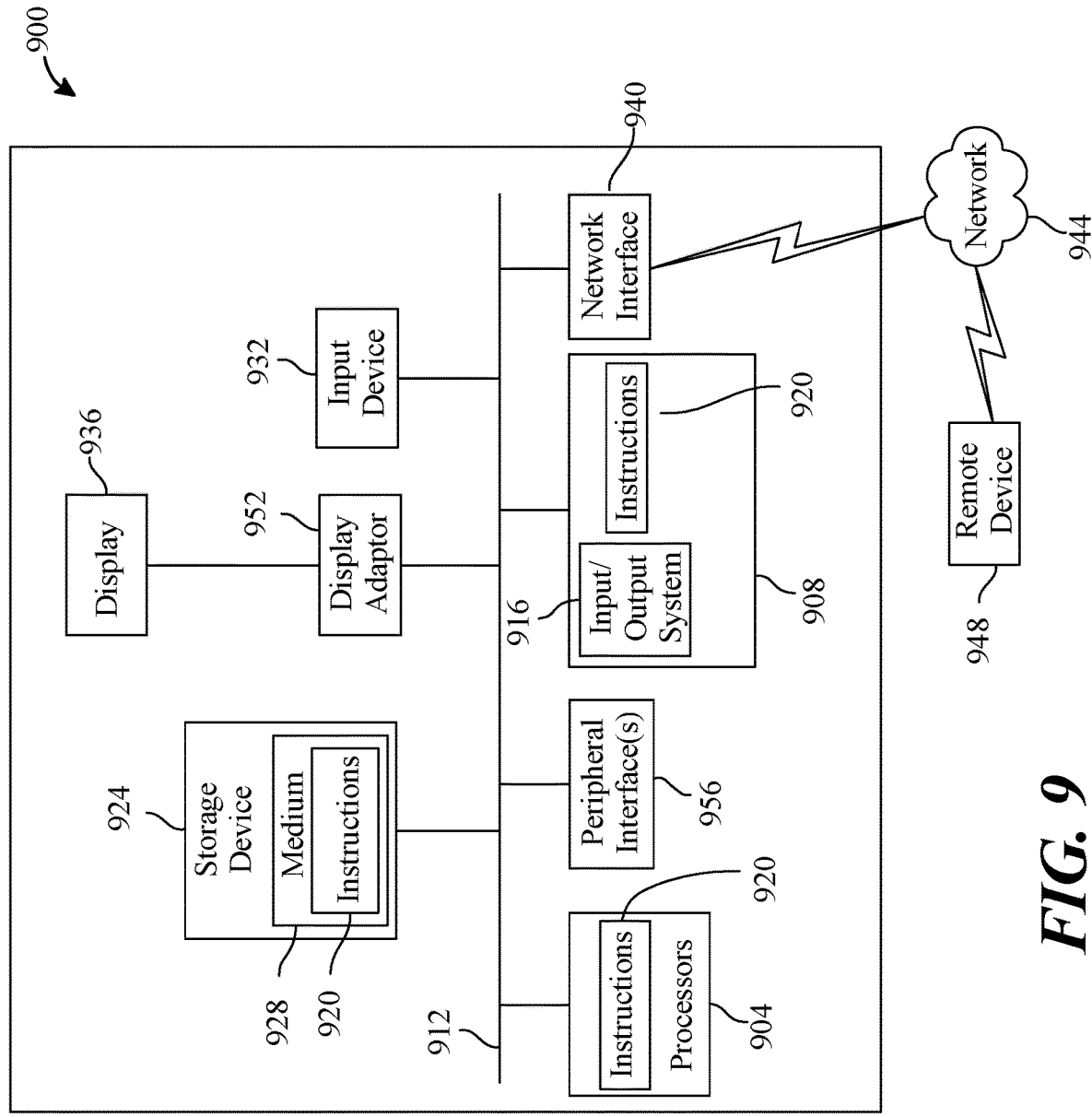
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric aircraft having a head-up display, the electric aircraft comprising:
   at least a propulsor configured to generate thrust using an electric motor;
   at least a battery configured to power the electric motor of the at least a propulsor;
   a pilot device located within a physical cockpit and configured for use by a pilot;
   a computing device comprising at least a microprocessor communicatively connected to the pilot device, wherein the computing device is configured to:
      receive an aircraft datum; and
      generate a performance assessment model as a function of the aircraft datum, wherein the performance assessment model comprises at least a flight phase model depicting the power consumption of at least a battery for at least a portion of the flight
   an exterior view window configured to allow viewing of the surroundings of the electric aircraft and
   a data display component configured to display the performance assessment model on the exterior view window, wherein the data display comprises a plurality of projection devices arranged in a concave formation.

2. The electric aircraft of claim 1, wherein the pilot device further comprises a sensor, wherein the sensor is configured to:
   detect measured aircraft data, including a battery system datum associated with the at least a battery; and
   generate the aircraft datum as a function of the measured aircraft data.

3. The electric aircraft of claim 1, wherein the electric aircraft comprises an electric vertical take-off and landing aircraft wherein, the at least a propulsor comprises a lift propulsor configured to generate lift and a thrust propulsor configured to generate forward thrust.

4. The electric aircraft of claim 1, wherein the exterior view window is further configured to display a live feed.

5. The electric aircraft of claim 4, wherein the computing device is further configured to adjust the displaying of the performance assessment model based on the live feed.

6. The electric aircraft of claim 1, wherein the data display component includes at least a projection device.

7. The electric aircraft of claim 6, wherein the at least a projection device further comprises a first projection device configured to project a first display datum and a second projection device configured to project a second display datum, wherein the first display datum is distinct from the second display datum.

8. The electric aircraft of claim 1, wherein the pilot device further comprises a multifunction display.

9. The electric aircraft of claim 1, wherein the pilot device further comprises a primary flight display.

10. The electric aircraft of claim 1, wherein the pilot device is further configured to control which information is to be displayed onto the exterior view window.

11. A method for an electric aircraft having a head-up display, the method comprising:
   generating, using at least a propulsor, thrust using an electric motor;
   powering, using at least a battery, the electric motor of the at least a propulsor;
   receiving, by a computing device comprising at least a microprocessor communicatively connected to a pilot device located within a physical cockpit and configured for use by a pilot, an aircraft datum;
   generating a performance assessment model as a function of the aircraft datum, wherein the performance assessment model comprises at least a flight phase model depicting the power consumption of at least a battery for at least a portion of the flight; and
   displaying, by a data display component, the performance assessment model onto an exterior view window configured to allow viewing of the surroundings of the electric aircraft, wherein the data display comprises a plurality of projection devices arranged in a concave formation.

12. The method of claim 11, wherein the method further comprises:
   detecting, by a sensor communicatively connected to the pilot device, measured aircraft data, including a battery system datum associated with the at least a battery; and
   generating the aircraft datum as a function of the measured aircraft data.

13. The method of claim 11, wherein the electric aircraft comprises an electric vertical take-off and landing aircraft, wherein the at least a propulsor comprises a lift propulsor configured to generate lift and a thrust propulsor configured to generate forward thrust.

14. The method of claim 11, wherein the method further comprises displaying, by the exterior view window, a live feed.

15. The method of claim 14, wherein displaying the live feed further comprises adjusting the displaying of the performance assessment model based on the live feed.

16. The method of claim 11, wherein the data display component includes at least a projection device.

17. The method of claim 16, wherein the method further comprises:
   displaying, by a first projection device, a first display datum; and
   displaying, by a second projection device, a second display datum, wherein the second display datum is distinct from the first display datum.

18. The method of claim 11, wherein the pilot device further comprises a multifunction display.

19. The method of claim 11, wherein the pilot device further comprises a primary flight display.

20. The method of claim 11, wherein the method further comprises controlling, by the pilot device, which information is to be displayed onto the exterior view window.

* * * * *